US012633229B2

(12) United States Patent
Thomen et al.

(10) Patent No.: US 12,633,229 B2
(45) Date of Patent: May 19, 2026

(54) RACING AND FLIGHT SIMULATOR CHASSIS

(71) Applicant: Cooler Master Technology Inc., Taipei (TW)

(72) Inventors: Aaron Thomen, Taipei (TW); Yones Rahmati, Taipei (TW); Robert Chave, Taipei (TW)

(73) Assignee: Cooler Master Technology, Inc., Taipei City (TW)

( * ) Notice: Subject to any disclaimer, the term of this patent is extended or adjusted under 35 U.S.C. 154(b) by 733 days.

(21) Appl. No.: 18/075,478

(22) Filed: Dec. 6, 2022

(65) Prior Publication Data

US 2024/0185737 A1 Jun. 6, 2024

(51) Int. Cl.
*G09B 9/04* (2006.01)
*G09B 9/08* (2006.01)

(52) U.S. Cl.
CPC ................. *G09B 9/04* (2013.01); *G09B 9/08* (2013.01)

(58) Field of Classification Search
CPC .................................... G09B 9/04; G09B 9/08
See application file for complete search history.

(56) References Cited

U.S. PATENT DOCUMENTS

| | | | | | |
|---|---|---|---|---|---|
| 10,070,123 | B1 * | 9/2018 | Yin | ...................... | G09G 3/2092 |
| 2004/0077464 | A1 * | 4/2004 | Feldman | ............ | A63B 22/0007 434/61 |

| | | | | | |
|---|---|---|---|---|---|
| 2005/0069839 | A1 * | 3/2005 | Denne | ................... | G09B 9/165 434/29 |
| 2005/0159219 | A1 * | 7/2005 | Oswald | .................. | A63F 13/98 463/36 |
| 2006/0079817 | A1 * | 4/2006 | Dewald | ............. | A63B 21/4019 482/901 |
| 2010/0279255 | A1 * | 11/2010 | Williams, II | ........... | G09B 9/14 434/29 |
| 2011/0238079 | A1 * | 9/2011 | Hannaford | ............. | A61B 34/76 606/130 |
| 2012/0282588 | A1 * | 11/2012 | Stevens | ................... | G09B 9/04 434/365 |
| 2014/0212848 | A1 * | 7/2014 | Newman | ................. | G09B 9/12 434/59 |

(Continued)

FOREIGN PATENT DOCUMENTS

| | | |
|---|---|---|
| CN | 204143671 U | 2/2015 |
| WO | 2020185072 A1 | 9/2020 |

*Primary Examiner* — Malina D. Blaise
(74) *Attorney, Agent, or Firm* — Merchant & Gould P.C.

(57) ABSTRACT

A racing and flight simulator chassis including a chassis frame, chassis subframe, incremental attachment assembly, and pivot locking member is provided. The chassis subframe is pivotally attached between the chassis frame on opposing sides, respectfully, and rotatable. The incremental attachment assembly is mounted to a pair of rail frame supports of the chassis frame. The pivot locking member is configured to releasably lock the chassis subframe to the chassis frame via attachment to at least the incremental attachment assembly at, at least two different rotation angles. A rotation angle of the at least two different rotation angles is an angle about pivot points of the pivotal attachments of the chassis subframe and chassis frame. When the chassis subframe rotates relative to the chassis frame, a length and a height of the racing and flight simulator chassis changes.

20 Claims, 12 Drawing Sheets

(56)      References Cited

U.S. PATENT DOCUMENTS

| | | | | |
|---|---|---|---|---|
| 2014/0302462 | A1* | 10/2014 | Vatcher | G09B 9/12 |
| | | | | 434/55 |
| 2015/0048933 | A1* | 2/2015 | Danieau | G08B 6/00 |
| | | | | 340/407.1 |
| 2015/0061847 | A1* | 3/2015 | Danieau | A63G 31/16 |
| | | | | 340/407.1 |
| 2016/0140862 | A1* | 5/2016 | Van Lookeren Campagne | |
| | | | | G09B 9/12 |
| | | | | 434/55 |
| 2016/0195923 | A1* | 7/2016 | Nauseef | A47C 7/72 |
| | | | | 297/344.21 |
| 2016/0303484 | A1* | 10/2016 | Masutti | A63G 31/16 |
| 2016/0320862 | A1* | 11/2016 | Schradin | A63F 13/211 |
| 2017/0072327 | A1* | 3/2017 | Wach | A63G 31/16 |
| 2017/0221376 | A1* | 8/2017 | Gosselin | B25J 17/0216 |
| 2018/0089900 | A1* | 3/2018 | Rober | B60K 35/26 |
| 2018/0113312 | A1* | 4/2018 | Jung | A61H 7/00 |
| 2018/0372061 | A1* | 12/2018 | Vamvas | F03B 13/20 |
| 2019/0099678 | A1* | 4/2019 | Khan | A63F 13/44 |
| 2019/0130782 | A1* | 5/2019 | Nissen | G06T 19/006 |
| 2020/0035114 | A1* | 1/2020 | Koga | A47C 1/00 |
| 2020/0035117 | A1* | 1/2020 | Biddle | G09B 9/12 |

* cited by examiner

RACING AND FLIGHT SIMULATOR CHASSIS

TECHNICAL FIELD

Example embodiments relate generally to the field of gaming, industrial, and military sims (simulators) and, more particularly, to sturdy and rigid all-in-one multi-position racing and flight simulator chassis'.

BACKGROUND

The hardware and software for gaming, industrial, and military sims (simulators) have progressed to where an immersive environment simulating real world physics variables or near-real world physics variables may be offered to make the sims instructional and/or fun. For sims that replicate driving a vehicle, flying an aircraft or steering and operating an aquatic vessel, basic set-ups may include access to a platform (simulation software), hardware (PC or console), a monitor, and suitable peripheral equipment such as a steering wheel and pedal set or yoke (control column)/joystick/flight stick and rudder pedal or anti-torque pedal set. For a more real-life set-up, a driving or flying seat and curved monitor or multiple monitors and/or virtual reality (VR) headsets may be used and force-feedback steering wheel/pedal control systems or direct drive wheel/pedal control systems and gearshifts/shifters may be mounted to a sim chassis/rig/cockpit.

On the high end, full sized simulators with motors and other machinery are available, giving users the most real life driving or flying experience. Such simulators are extremely large and heavy, are expensive, are proprietary, are of a specific or class of vehicle(s) or aircraft(s), and are complex to set up, especially for home users. In the mid-range, multi-position simulators are available, providing a cockpit that may be adjusted for different driving or flying positions such as upright GT positions or low slung, high-pedal Formula positions for sim racing. These simulators are sized to the cockpit, somewhat heavy and pricey for the average home user, and require space and multiple and separate steps for adjustments such as for adjusting the seat, pedals, and steering wheel or yoke (control column)/joystick/flight stick. On the low end, a less rigid and less sturdy cockpit may be provided for a specific or class of vehicle(s) or aircraft(s). For low end simulators, unintended movement of the sim chassis under duress during use, such as flex, often occurs.

SUMMARY

Various aspects of the present disclosure provide a racing and flight simulator chassis for simulators that replicate driving a vehicle, flying an aircraft, or operating a vessel.

According to one aspect of the present disclosure, the racing and flight simulator chassis includes a chassis frame, a chassis subframe, a seat mount assembly, a pedal deck, a steering deck, an incremental attachment assembly, and a pivot locking member. The chassis frame includes a base frame, a rail frame, and a pair of rail frame supports. The rail frame includes a pair of rail mounting portions and a rail free portion. The rail free portion is opposite the pair of rail mounting portions. Each of the pair of rail mounting portions is mounted to the base frame. The pair of rail frame supports is mounted to the rail free portion and the base frame on opposing ends of the pair of rail frame supports, respectively, with a gap therebetween. A chassis subframe includes a front cockpit member and a back cockpit member.

The front cockpit member includes a front bottom portion, a front upper portion, and at least one crossmember. The at least one crossmember is mounted to the front cockpit member on opposing ends of the at least one crossmember, respectively. The front cockpit member is mounted to the back cockpit member via the front bottom portion. The back cockpit member includes a pair of bottom supporting subframe members on opposing bottom sides of the back cockpit member. The chassis subframe is pivotally attached between the chassis frame on opposing sides, respectfully, and rotatable, whereby when attached, the front bottom portion is nearer to the base frame than the front upper portion. The seat mount assembly is assembled to the back cockpit member, the pedal deck is mounted to the front bottom portion, the steering deck is mounted to the front upper portion, and the incremental attachment assembly is mounted to the pair of rail frame supports. The pivot locking member is configured to releasably lock the chassis subframe to the chassis frame via attachment to at least the incremental attachment assembly at, at least two different rotation angles. The rotation angle of the at least two different rotation angles is an angle about pivot points of the pivotal attachments of the chassis subframe on opposing sides and between the chassis frame. The rotation angle is formed between the chassis subframe relative to the chassis frame.

According to another aspect of the present disclosure, the racing and flight simulator chassis further includes a seat, a pedal assembly, and a control assembly. The seat is removably and adjustably assembled to the seat mount assembly. The pedal assembly is removably and adjustably assembled to the pedal deck. The control assembly is removably and adjustably assembled to the steering deck. The seat is vertically adjustable to the seat mount assembly and the seat mount assembly is rotationally and longitudinally adjustable to the back cockpit member. The pedal assembly is angularly adjustable to the pedal deck and the pedal deck is longitudinally adjustable to the front bottom portion. The steering deck is vertically and longitudinally adjustable to the front upper portion.

According to another aspect of the present disclosure, the chassis subframe further includes a pair of supporting attachment assemblies on opposing upper sides of the front bottom portion and the back cockpit member, respectively. The pair of supporting attachment assemblies support mounting of the front cockpit member to the back cockpit member via the front bottom portion.

According to another aspect of the present disclosure, the racing and flight simulator chassis further includes a shaft and a pair of rotational devices. Each of the pair of rotational devices is mounted to each of the pair of rail mounting portions, respectively. The shaft is mounted through the pair of bottom supporting subframe members and to the pair of rotational devices, respectively. The chassis subframe is pivotally attached between the chassis frame on opposing sides via the shaft and the pair of rotational devices. According to another aspect of the present disclosure, the rotational device includes a bearing or a biasing device.

According to another aspect of the present disclosure, the racing and flight simulator chassis further includes a pair of linear actuators attached to the pair of bottom supporting subframe members and base frame, respectively. The pair of linear actuators include a hydraulic linear actuator or a pneumatic linear actuator.

According to another aspect of the present disclosure, a range of the rotation angle is between 40% to 50%, inclusive.

According to another aspect of the present disclosure, when the chassis subframe rotates relative to the chassis frame, a length of the racing and flight simulator chassis between a back end portion of the pair of rail frame supports to a front tip portion of the front cockpit member changes. The longest length of the racing and flight simulator chassis is between 5% to 7%, inclusive, greater than a shortest length of the racing and flight simulator chassis.

According to another aspect of the present disclosure, when the chassis subframe rotates relative to the chassis frame, a height of the racing and flight simulator chassis between a bottom portion of the base frame to a top portion of the steering deck changes. The highest height of the racing and flight simulator chassis is between 10% to 12%, inclusive, greater than a lowest height of the racing and flight simulator chassis.

According to another aspect of the present disclosure, the base frame, the rail frame, and the pair of rail frame supports are integrally formed.

According to another aspect of the present disclosure, the chassis frame and chassis subframe include at least one of a metal, metal alloy, aluminum, metal alloy coated material, or aluminum coated material, or any combination of the foregoing.

According to an aspect of the present disclosure, the racing and flight simulator cockpit, includes a chassis frame, a chassis subframe, a seat mount assembly, a seat, a pedal deck, a pedal assembly, a steering deck, a control assembly, an incremental attachment assembly, and a pivot locking member. The chassis frame includes a base frame, a rail frame, and a pair of rail frame supports. The rail frame includes a pair of rail mounting portions and a rail free portion. The rail free portion is opposite the pair of rail mounting portions. Each of the pair of rail mounting portions is mounted to the base frame. The pair of rail frame supports is mounted to the rail free portion and the base frame on opposing ends of the pair of rail frame supports, respectively, with a gap therebetween. The chassis subframe includes a front cockpit member and a back cockpit member. The front cockpit member includes a front bottom portion, a front upper portion, and at least one crossmember. The at least one crossmember is mounted to the front cockpit member on opposing ends of the at least one crossmember, respectively. The front cockpit member is mounted to the back cockpit member via the front bottom portion. The back cockpit member includes a pair of bottom supporting subframe members on opposing bottom sides of the back cockpit member. The chassis subframe is pivotally attached between the chassis frame on opposing sides, respectfully, and rotatable, whereby when attached, the front bottom portion is nearer to the base frame than the front upper portion. The seat mount assembly is assembled to the back cockpit member, the seat is removably and adjustably assembled to the seat mount assembly and the pedal deck is mounted to the front bottom portion. The pedal assembly is removably and adjustably assembled to the pedal deck, the steering deck is mounted to the front upper portion, the control assembly is removably and adjustably assembled to the steering deck, and the incremental attachment assembly is mounted to the pair of rail frame supports. The pivot locking member is configured to releasably lock the chassis subframe to the chassis frame via attachment to at least the incremental attachment assembly at, at least two different rotation angles. The seat is vertically adjustable to the seat mount assembly and the seat mount assembly is rotationally and longitudinally adjustable to the back cockpit member. The pedal assembly is angularly adjustable to the pedal deck and the pedal deck is longitudinally adjustable to the front bottom portion. The steering deck is vertically and longitudinally adjustable to the front upper portion. The rotation angle of the at least two different rotation angles is an angle about pivot points of the pivotal attachments of the chassis subframe on opposing sides and between the chassis frame. The rotation angle is formed between the chassis subframe relative to the chassis frame.

According to another aspect of the present disclosure, the chassis subframe further includes a pair of supporting attachment assemblies on opposing upper sides of the front bottom portion and the back cockpit member, respectively. The pair of supporting attachment assemblies support mounting of the front cockpit member to the back cockpit member via the front bottom portion.

According to another aspect of the present disclosure, the racing and flight simulator cockpit further includes a shaft and a pair of rotational devices. Each of the pair of rotational devices is mounted to each of the pair of rail mounting portions, respectively. The shaft is mounted through the pair of bottom supporting subframe members and to the pair of rotational devices, respectively. The rotational device includes a bearing or a biasing device. The chassis subframe is pivotally attached between the chassis frame on opposing sides via the shaft and the pair of rotational devices.

According to another aspect of the present disclosure, the racing and flight simulator cockpit further includes a pair of linear actuators attached to the pair of bottom supporting subframe members and base frame, respectively. The pair of linear actuators include a hydraulic linear actuator or a pneumatic linear actuator.

According to another aspect of the present disclosure, a range of the rotation angle is between 40% to 50%, inclusive.

According to another aspect of the present disclosure, when the chassis subframe rotates relative to the chassis frame, a length of the racing and flight simulator chassis between a back end portion of the pair of rail frame supports to a front tip portion of the front cockpit member changes. The longest length of the racing and flight simulator chassis is between 5% to 7%, inclusive, greater than a shortest length of the racing and flight simulator chassis.

According to another aspect of the present disclosure, when the chassis subframe rotates relative to the chassis frame, a height of the racing and flight simulator chassis between a bottom portion of the base frame to a top portion of the steering deck changes. The highest height of the racing and flight simulator chassis is between 10% to 12%, inclusive, greater than a lowest height of the racing and flight simulator chassis.

According to another aspect of the present disclosure, the base frame, the rail frame, and the pair of rail frame supports are integrally formed.

According to another aspect of the present disclosure, the chassis frame and chassis subframe include at least one of a metal, metal alloy, aluminum, metal alloy coated material, or aluminum coated material, or any combination of the foregoing.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
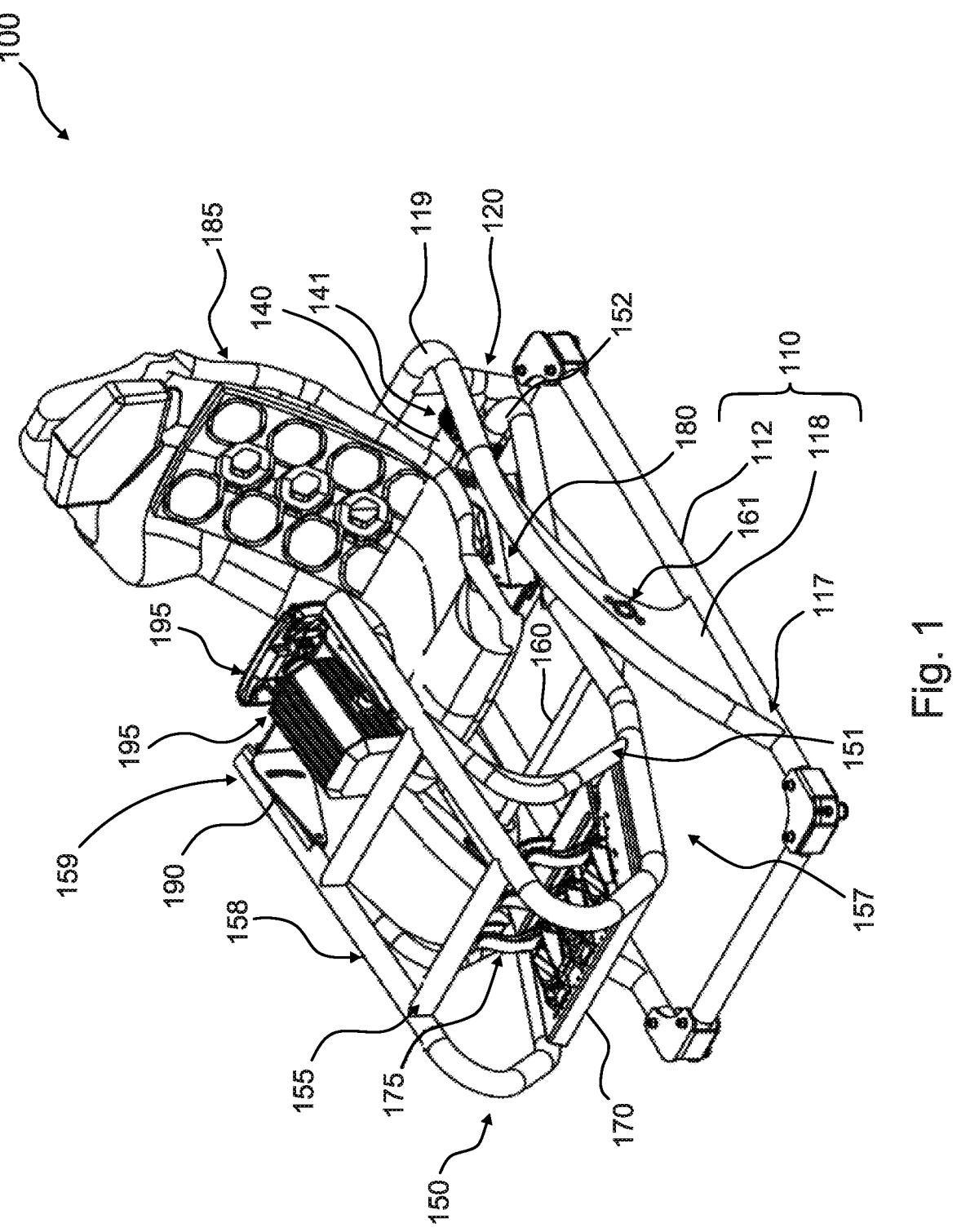
FIG. 1 illustrates a perspective view of a racing and flight simulator chassis, according to disclosed embodiments.

The following describes various principles related to racing and flight simulator systems by way of reference to specific examples of racing and flight simulator chassis', including specific arrangements and examples of chassis frames and chassis subframes embodying innovative concepts. More particularly, but not exclusively, such innovative principles are described in relation to selected examples of shafts, bearings, biasing devices, and supporting attachment assemblies and well-known functions or constructions are not described in detail for purposes of succinctness and clarity. Nonetheless, one or more of the disclosed principles can be incorporated in various other embodiments of shafts, bearings, biasing devices, and supporting attachment assemblies to achieve any of a variety of desired outcomes, characteristics, and/or performance criteria.

Thus, racing and flight simulator chassis' having attributes that are different from those specific examples discussed herein can embody one or more of the innovative principles, and can be used in applications not described herein in detail. Accordingly, embodiments not described herein in detail also fall within the scope of this disclosure, as will be appreciated by those of ordinary skill in the relevant art following a review of this disclosure.

In the illustrated embodiments, in addition to generally relating to racing and flight simulator chassis', the racing and flight simulator chassis' may also relate to transportation, automotive, aeronautical, spaceflight, and marine simulators. Examples include simulation of wheeled and tracked vehicles such as military, earthmoving and agricultural equipment, simulation of airplanes and spacecraft engaged in general flight or docking maneuvers, and simulation of surface, sub-surface, and surface effect marine vehicles such as submersibles, single or multihull surface vessels, hydrofoils.

In the illustrated embodiments, in addition to sim software, hardware, monitors, and suitable peripheral equipment such as VR headsets, steering wheels and pedal sets or yoke (control column)/joystick/flight stick and rudder pedal or anti-torque pedal sets, gearshifts/shifters, and driving or flying seats, the racing and flight simulator chassis' and cockpits may include hardware and conversion kits which even further enhance the immersive and real-life experience of users. For example, steering wheels and pedal sets or yoke (control column)/joystick/flight stick and rudder pedal or anti-torque pedal sets may also be setup to rumble, shake, or the like, simulating force feedback or the like, simulating the feel of tire traction, vehicle suspension, vehicle or aircraft aerodynamics, and tire grip. The seat may be configured to rumble via subwoofers and provide surround sound. For clarity of illustration, the racing and flight simulator chassis and system is simplified, and in practice, can be varied.

Example embodiments as disclosed herein are directed to racing and flight simulator chassis' including a chassis frame, a chassis subframe, an incremental attachment assembly, and a pivot locking member. The chassis subframe is pivotally attached between the chassis frame on opposing sides, respectfully, and rotatable. The incremental attachment assembly is mounted to a pair of rail frame supports of the chassis frame. The pivot locking member is configured to releasably lock the chassis subframe to the chassis frame via attachment to at least the incremental attachment assembly at, at least two different rotation angles. A rotation angle of the at least two different rotation angles is an angle about pivot points of the pivotal attachments of the chassis subframe and chassis frame. When the chassis subframe rotates relative to the chassis frame, a length and a height of the racing and flight simulator chassis changes.

FIG. 1 illustrates a perspective view of a racing and flight simulator chassis 100, according to disclosed embodiments. As illustrated in FIG. 1, a racing and flight simulator chassis 100 includes a chassis frame 110, chassis subframe 150, incremental attachment assembly 140, and pivot locking member 141. The chassis frame 110 includes a pair of rail frame supports 120. The chassis subframe 150 is pivotally attached between the chassis frame 110 on opposing sides, respectfully, and rotatable. The incremental attachment assembly 140 is mounted to the pair of rail frame supports 120 of the chassis frame 110. Generally, at least a portion of the chassis frame 110, chassis subframe 150, and incremental attachment assembly 140 is made from steel tubing for strength and support, as an example, A572 structural steel tubing. However, the embodiments are not limited thereto. Those of ordinary skill in the relevant art may utilize other or materials known in the art for the chassis frame 110, chassis subframe 150, and incremental attachment assembly 140, as long as strength and support of the racing and flight simulator chassis 100 is not compromised. A material of the chassis frame 110, chassis subframe 150, and incremental attachment assembly 140 may be metal, metal alloy, aluminum, metal alloy coated material, or aluminum coated material, or any combination of the foregoing. The pivot locking member 141 is configured to releasably lock the chassis subframe 150 to the chassis frame 110 via attachment to at least the incremental attachment assembly 140 at, at least two different rotation angles. As illustrated, the pivot locking member 141 releasably locks the chassis subframe 150 to the chassis frame 110 via attachment to at least the incremental attachment assembly 140 and the chassis subframe 150 at, at least two different rotation angles. An amount of the pivot locking member 141 may be one, two, or two or more pivot locking members 141, and the embodiments are not limited thereto, as long as the pivot locking member 141 is configured to releasably lock the chassis subframe 150 to the chassis frame 110 via attachment to at least the incremental attachment assembly 140 at, at least two different rotation angles. As an example, the pivot locking member 141 may be at least one of a double pipe clamp (not shown), a set of opposing double pipe clamps, or the like, or any combination of the foregoing. As illustrated, the pivot locking member 141 is a set of opposing double pipe clamps that lock the chassis subframe 150 to the chassis frame 110 by having one of the double pipe clamp mounted on top of a back end of the chassis subframe 150 and the incremental attachment assembly 140 and the other of the double pipe clamp mounted, opposing, from a bottom of the back end of the chassis subframe 150 and the incremental attachment assembly 140 and fastened together, preventing movement of the racing and flight simulator chassis 100 during operation. As an example, the pivot locking member 141 may be one double pipe clamp (not shown) locking the chassis subframe 150 to the chassis frame 110 by mounting on top of the back end of the chassis subframe 150 and the incremental attachment assembly 140, preventing movement of the racing and flight simulator chassis 100 during operation. The one double pipe clamp may have a force of attraction with the back end of the chassis subframe 150 and the incremental attachment assembly 140 or have a weight, such that when mounted, movement of the racing and flight simulator chassis 100 during operation is prevented. A rotation angle of the at least two different rotation angles is an angle about pivot points of a pair of rotational devices 161 of the chassis subframe 150 and chassis frame 110. The rotation angle is formed between the chassis subframe 150 relative to the chassis frame 110. When the chassis subframe 150 rotates relative to the chassis frame 110, a length and a height of the racing and flight simulator chassis 100 changes. The rotation of the chassis subframe 150 to the chassis frame 110 is an up and down or oscillatory motion.

As illustrated, in addition to the chassis frame 110 having the pair of rail frame supports 120, chassis subframe 150, incremental attachment assembly 140, and pivot locking member 141, the chassis frame 110 may further include a base frame 112 and a rail frame 118. As an example, the base frame 112, the rail frame 118, and the pair of rail frame supports 120 may be integrally formed; however, the embodiments are not limited thereto. The base frame 112, the rail frame 118, and the pair of rail frame supports 120 may be individually formed, and later mounted thereamong. As long as the chassis subframe 150 may rotate to the chassis frame 110 and the racing and flight simulator chassis 100 is stable and rigid during operation. The rail frame 118 includes a pair of rail mounting portions 117 and a rail free portion 119. The rail free portion 119 is opposite the pair of rail mounting portions 117. Each of the pair of rail mounting portions 117 is mounted to the base frame 112. The pair of rail frame supports 120 is mounted to the rail free portion 119 and the base frame 112 on opposing ends of the pair of rail frame supports 120, respectively, with a gap therebetween. A shape of the chassis frame 110 is generally quadrilateral shaped and a shape of the rail frame 118 is generally U-shaped. The pair of rail mounting portions 117 are ends of the generally U-shaped rail frame 118 mounted to opposing sides of the base frame 112 near to a front end of the base frame 112 and the curved end of the generally U-shaped rail frame 118 protrudes upwardly and then longitudinally toward a back end of the base frame 112. A shape of each of the pair of rail mounting portions 117 or ends of the generally U-shaped rail frame 118 is generally triangular falcate and curved backward fin-shaped. A base of each of the pair of rail mounting portions 117 is a base of the triangle mounted to the base frame 112 and a tip of the triangle extends near to the back end of the base frame 112. The pair of rotational devices 161 is disposed generally above a center of the triangular falcate and curved backward fin-shape of the pair of rail mounting portions 117, allowing for rotation of the chassis subframe 150 to the chassis frame 110. The triangular base of the falcate and curved backward fin-shape of the pair of rail mounting portions 117 increases a maximum load of the rotating chassis subframe 150.

As illustrated, additionally, the chassis subframe 150 may include a front cockpit member 158 and a back cockpit member 152. The front cockpit member 158 includes a front portion 157, a front upper portion 159, and at least one crossmember 155. The at least one crossmember 155 is mounted to the front cockpit member 158 at opposing ends of the at least one crossmember 155, at corresponding positions of the front cockpit member 158, respectively. A shape of the chassis subframe 150 is generally two parallel U-shapes, separated by a gap defined by a length of the mounted at least one crossmember 155. As illustrated, an amount of the at least one crossmember 155 is two; however, the embodiments are not limited thereto. More than two at least one crossmember 155 may be implemented. The at least one crossmember 155 stabilizes and strengthens the racing and flight simulator chassis 100 during operation. The chassis subframe 150 may further include a pair of curved supporting members 151. One end of each of the pair of curved supporting members 151 is mounted near to one end of each of the U-shape of the chassis subframe 150 and the other end of each of the pair of curved supporting members 151, flared backwards, is mounted toward an other end of the generally two parallel U-shapes of the chassis subframe 150. The pair of curved supporting members 151 stabilizes and strengthens the racing and flight simulator chassis 100 during operation. The front upper portion 159 is defined by the mounted positions of the other end of the U-shape of each of the pair of curved supporting members 151 to an other end of the generally two parallel U-shape of the chassis subframe 150. The front portion 157 is defined by the mounted positions of each of the pair of curved supporting members 151 opposite the front upper portion 159. The back cockpit member 152 is generally U-clip shape. The front cockpit member 158 is mounted to the back cockpit member 152 via ends of each of the U-shape of the chassis subframe 150 and ends of the U-clip shape of the back cockpit member 152. The back cockpit member 152 includes a pair of bottom supporting subframe members 154 on opposing bottom sides of the back cockpit member 152. A shape of the pair of bottom supporting subframe members 154 is generally a drop point knife shape with the blade end near to the ends of the U-clip shape of the back cockpit member 152. An extended handle shape of the pair of bottom supporting subframe members 154 provides enhanced rigidity to the ends of the U-clip shape of the back cockpit member 152 when connected to each of the ends of the generally two parallel U-shape of the chassis subframe 150, increasing a maximum load of the front cockpit member 158 and preventing movement of the racing and flight simulator chassis 100 during operation. As illustrated in the embodiments, the pair of bottom supporting subframe members 154 is a gusset plate. The chassis subframe 150 is pivotally attached between the chassis frame 110 on opposing sides, respectfully, and rotatable, via the pair of bottom supporting subframe members 154, whereby when attached, the front portion 157 is nearer to the base frame 112 than the front upper portion 159.

As illustrated, the racing and flight simulator chassis 100 may further include a shaft 160. Each of the pair of rotational devices 161 is mounted to each of the pair of rail mounting portions 117, respectively. The shaft 160 is mounted through the pair of bottom supporting subframe members 154 and to the pair of rotational devices 161, respectively. The chassis subframe 150 is pivotally attached between the chassis frame 110 on opposing sides via the shaft 160 and the pair of rotational devices 161. In the illustrated embodiments, the pair of rotational devices 161 may include a bearing or a biasing device; however, the embodiments are not limited thereto. Those of ordinary skill in the relevant art may utilize other rotational devices or set ups known in the art, as long each of the pair of rotational devices 161 may be mounted to each of the pair of rail mounting portions 117 and the chassis subframe 150 is able to rotate in an up and down or oscillatory motion with the chassis frame 110.

As illustrated, in addition to the racing and flight simulator chassis 100 including the chassis frame 110 having the pair of rail frame supports 120, chassis subframe 150, incremental attachment assembly 140, and pivot locking member 141, the racing and flight simulator chassis 100 may further include a seat mount assembly 180, a pedal deck 170, and a steering deck 190. The seat mount assembly 180 is assembled to the back cockpit member 152 nearer to the pivotal attachment of the chassis subframe 150 between the chassis frame 110 than a bottom of the U-clip shape of the back cockpit member 152. The seat mount assembly 180 is assembled within the U-clip shape of the back cockpit member 152. The pedal deck 170 is mounted to the front portion 157 near to a front end of the front cockpit member 158, between the generally two parallel U-shapes of the chassis subframe 150. The steering deck 190 is mounted to the front upper portion 159 near to and between each of the other end of the generally two parallel U-shape of the chassis subframe 150. The seat mount assembly 180 is generally quadrilateral shape, the pedal deck 170 is generally quadrilateral shape, and the steering deck 190 is generally flat U-shape having triangular-shape arms and a rectangular-like shape base having a central throughole.

As illustrated, the racing and flight simulator chassis 100 further may include a seat 185, a pedal assembly 175, and a control assembly 195. The seat 185 is removably and adjustably assembled to the seat mount assembly 180. The pedal assembly 175 is removably and adjustably assembled to the pedal deck 170. The control assembly 195 is removably and adjustably assembled to the steering deck 190. The seat 185 is vertically adjustable to the seat mount assembly 180 and the seat mount assembly 180 is rotationally and longitudinally adjustable to the back cockpit member 152. The vertical adjustment of the seat mount assembly 180 includes a front vertical adjustment and a rear vertical adjustment. The front vertical adjustment individually adjusts a front portion of the seat 185 and the rear vertical adjustment individually adjusts a rear portion of the seat 185. The pedal assembly 175 is angularly adjustable to the pedal deck 170 and the pedal deck 170 is longitudinally adjustable to the front portion 157. The steering deck 190 is vertically rotatably adjustable and longitudinally adjustable to the front upper portion 159.

In the illustrated embodiments, the seat mount assembly 180 includes a pair of universal side mount L-brackets having pre-drilled holes therethrough and the seat 185 is a side mount racing and/or flight seat. The seat 185 may be different types and/or brands of side mount racing and/or flight seats and the seat mount assembly 180 is configured for various types and/or brands of seats 185 to be mounted thereto via the pre-drilled holes; however, the embodiments are not limited thereto. Those of ordinary skill in the relevant art may utilize other bracketing systems known in the art, as long the seat 185 may be mounted thereto and is vertically adjustable to the seat mount assembly 180 and the seat mount assembly 180 is rotationally and longitudinally adjustable to the back cockpit member 152.

In the illustrated embodiments, the pedal deck 170 includes a deck or plate having pre-drilled holes therethrough and the pedal assembly 175 may be different types and/or brands of pedal assemblies. The pedal assembly 175 is configured to withstand, as an example, at least 140 kg of actual force at the brake pedal and a load cell of 200 kg; however, the embodiments are not limited thereto. The pedal assembly 175 may be configured to withstand, less than or greater than 140 kg of actual force at the brake pedal and/or a load cell of 200 kg, respectively. The pedal deck 170 is configured for various types and/or brands of pedal assemblies 175 to be mounted thereto via the pre-drilled holes; however, the embodiments are not limited thereto. Those of ordinary skill in the relevant art may utilize other deck or plate systems known in the art, as long as the pedal assembly 175 may be mounted thereto, is angularly adjustable to the pedal deck 170 and the pedal deck 170 is longitudinally adjustable to the front portion 157. As an example, the pedal assembly 175 may further include different types and/or brands of rudder pedals. In the illustrated embodiments, a material of the pedal deck 170 is aluminum; however, the embodiments are not limited thereto. The pedal deck 170 may be made of other material commonly known in the art, as an example, steel, aluminum-alloy, or steel-alloy, as long as the pedal assembly 175 may be mounted to the pedal deck 170 and is angularly adjustable to the pedal deck 170 and the pedal deck 170 is longitudinally adjustable to the front portion 157.

In the illustrated embodiments, as an example, a size of the pedal deck 170 is 19" inches×16" inches×4" inches or 20" inches×9" inches×6" inches; however, the embodiments are not limited thereto. The size of the pedal deck 170 may be smaller than or larger than 19" inches×16" inches×4" inches or 20" inches×9" inches×6" inches, as long as the pedal assembly 175 may be mounted to the pedal deck 170 and is angularly adjustable to the pedal deck 170 and the pedal deck 170 is longitudinally adjustable to the front portion 157.

In the illustrated embodiments, each of the triangular-shape arms of the steering deck 190 includes a curved oval opening disposed therethrough, whereby the steering deck 190 may be rotatably adjusted upward or downward. The control assembly 195 may be different types and/or brands of racing and/or flight control assemblies and the steering deck 190 is configured for various types and/or brands of control assemblies to be mounted thereto. As illustrated, the control assembly 195 is a front-mount direct drive force feedback wheel base generating up to 20 Nm of torque. Those of ordinary skill in the relevant art may readily appreciate however that the control assembly 195 may generate less than or greater than 20 Nm of torque, and the steering deck 190 may support different types and/or brands of racing and/or flight control assemblies, and the embodiments are not limited thereto. In addition to supporting front-mount direct drive force feedback wheel bases, the steering deck 190 may further support plate-mount direct drive force feedback wheel bases and may further support side mount direct drive force feedback wheel bases via interchangeable bracket systems (not shown) and the embodiments are not limited thereto. The steering deck 190 may further support different types and/or brands of flight yokes, and single- and dual-throttle joysticks, as examples.

In the illustrated embodiments, as an example, a size of the steering deck 190 is 13" inches×10" inches×3" inches; however, the embodiments are not limited thereto. The size of the pedal deck 170 may be smaller than or larger than 13" inches×10" inches×3" inches, as long as the control assembly 195 may be mounted to the steering deck 190 and is vertically rotatably adjustable and longitudinally adjustable to the steering deck 190.

Figures 2A, 2B:
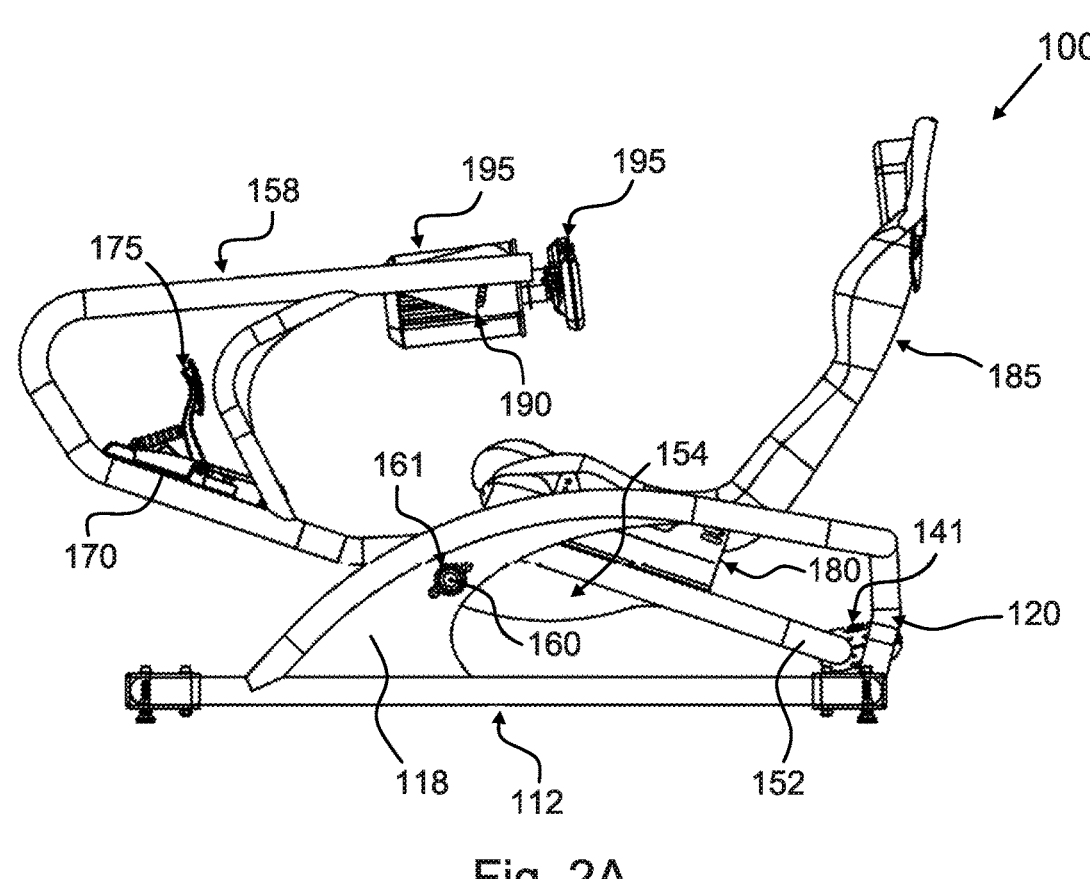
FIG. 2A illustrates a perspective view of the racing and flight simulator chassis of FIG. 1 in a tilted back position, according to disclosed embodiments.
FIG. 2B illustrates a depiction of the racing and flight simulator chassis of FIG. 2A, according to disclosed embodiments.

FIG. 2A illustrates a perspective view of the racing and flight simulator chassis 100 of FIG. 1 in a tilted back position, according to disclosed embodiments. FIG. 2B illustrates a depiction of the racing and flight simulator chassis 100 of FIG. 2A, according to disclosed embodiments. As illustrated in FIGS. 2A to 2B, and as illustrated in FIG. 1, one of the at least two different rotation angles whereby the pivot locking member 141 releasably locks the chassis subframe 150 to the chassis frame 110 via attachment to at least the incremental attachment assembly 140 may define a tilted back position of the racing and flight simulator chassis 100. When in the tilted back position, the racing and flight simulator chassis 100 is operational for, as an example, Formula 1 racing simulations and glider flight simulations (not shown).

Figure 3A:
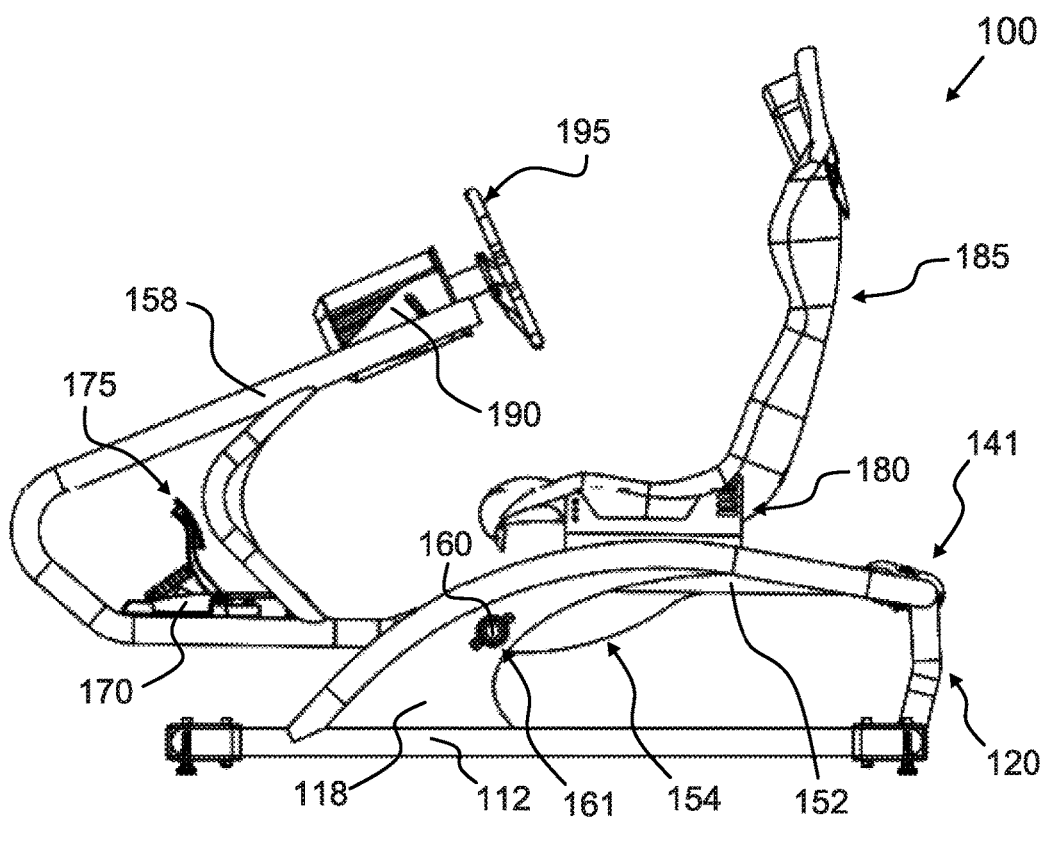
FIG. 3A illustrates a perspective view of the racing and flight simulator chassis of FIG. 1 in an upright position, according to disclosed embodiments.
Figure 3B:
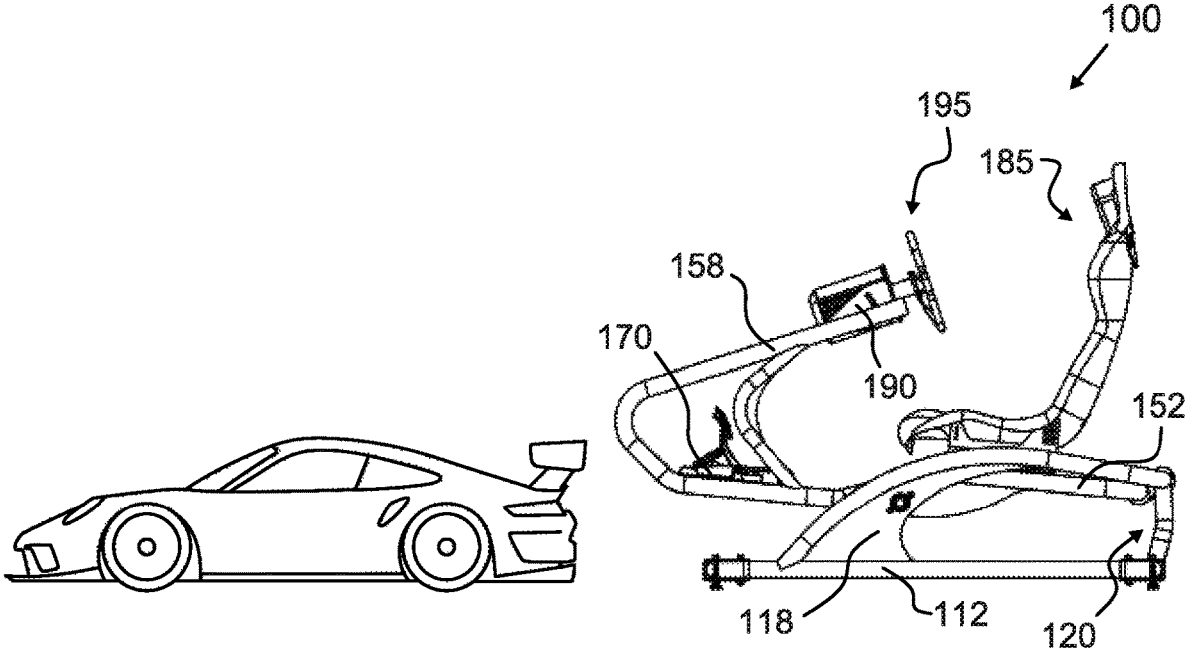
FIG. 3B illustrates a depiction of the racing and flight simulator chassis of FIG. 3A, according to disclosed embodiments.
Figure 3C:
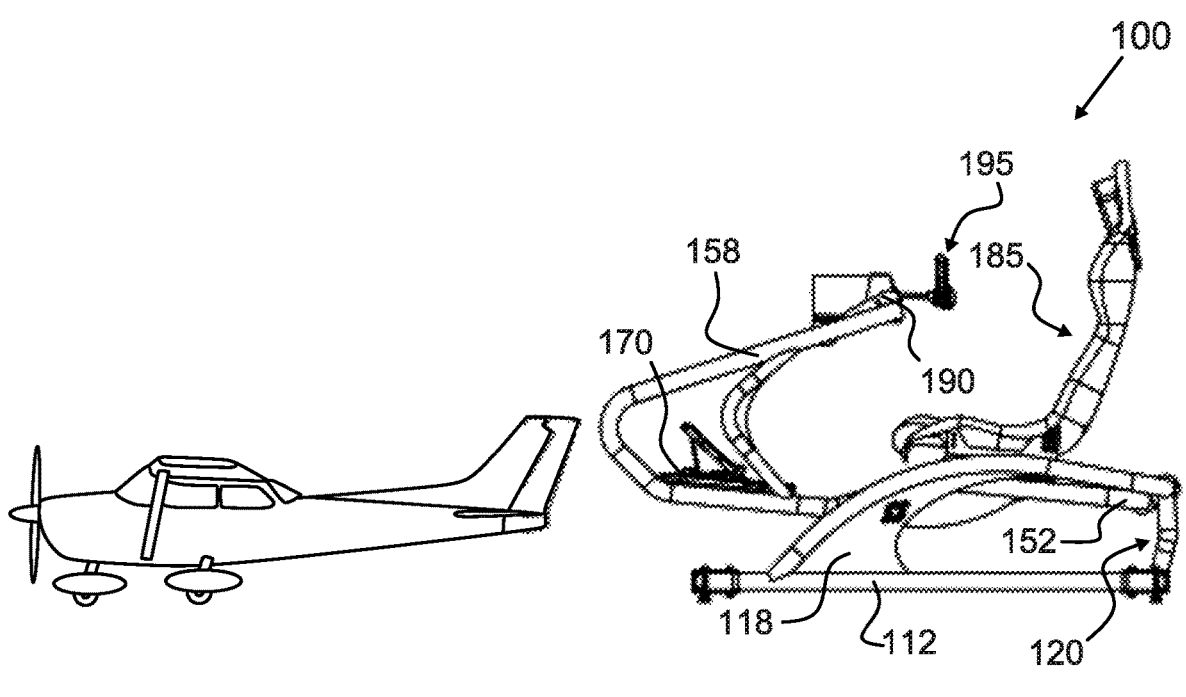
FIG. 3C illustrates another depiction of the racing and flight simulator chassis of FIG. 3A, according to disclosed embodiments.

FIG. 3A illustrates a perspective view of the racing and flight simulator chassis 100 of FIG. 1 in an upright position, according to disclosed embodiments. FIG. 3B illustrates a depiction of the racing and flight simulator chassis 100 of FIG. 3A, according to disclosed embodiments. FIG. 3C illustrates another depiction of the racing and flight simulator chassis 100 of FIG. 3A, according to disclosed embodiments. As illustrated in FIGS. 3A to 3C, and as illustrated in FIGS. 1 and 2A to 2B, the other of the at least two different rotation angles whereby the pivot locking member 141 releasably locks the chassis subframe 150 to the chassis frame 110 via attachment to at least the incremental attachment assembly 140 may define an upright position of the racing and flight simulator chassis 100. When in the upright position, the racing and flight simulator chassis 100 is operational for, as an example, GT racing simulations and Cessna flight simulations.

Those of ordinary skill in the relevant art may readily appreciate that in addition to the at least two different rotation angles, more than at least two different rotation angles may be achieved by the racing and flight simulator chassis 100 of the embodiments via the incremental attachment assembly 140 and the pivot locking member 141. As such, the racing and flight simulator chassis 100 may be operational for different types and/or brands of racing and/or flight systems, also allowing for hybrid racing, driving or flight set-ups.

Figure 4A:
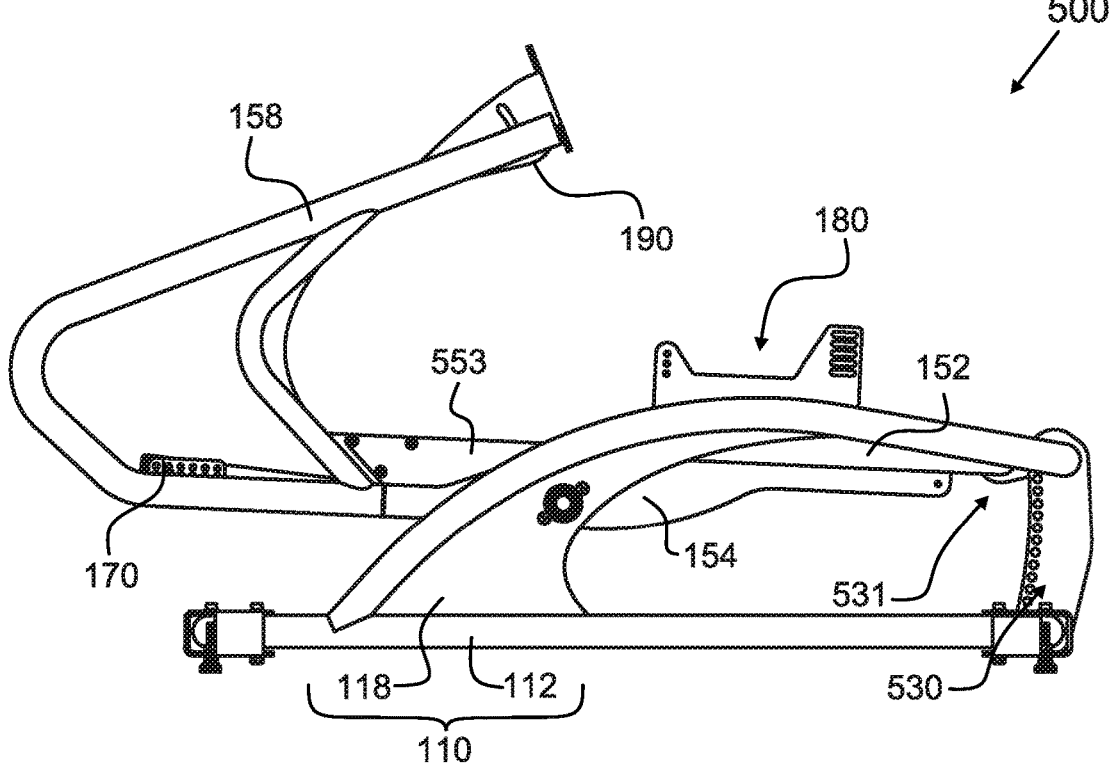
FIG. 4A illustrates a perspective view of another racing and flight simulator chassis, according to disclosed embodiments.
Figure 4B:
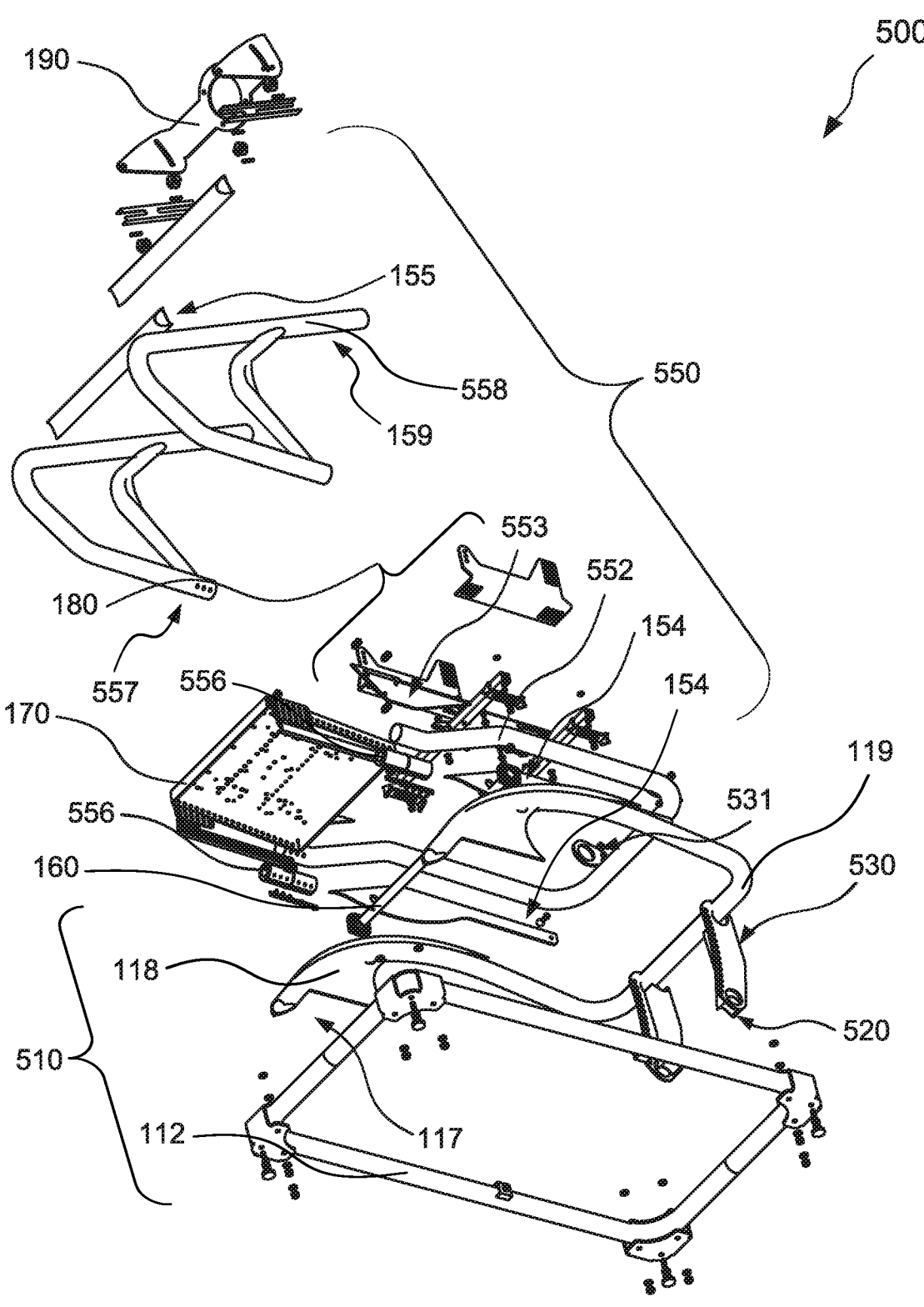
FIG. 4B illustrates an exploded view of the another racing and flight simulator chassis of FIG. 4A, according to disclosed embodiments.
Figure 5A:
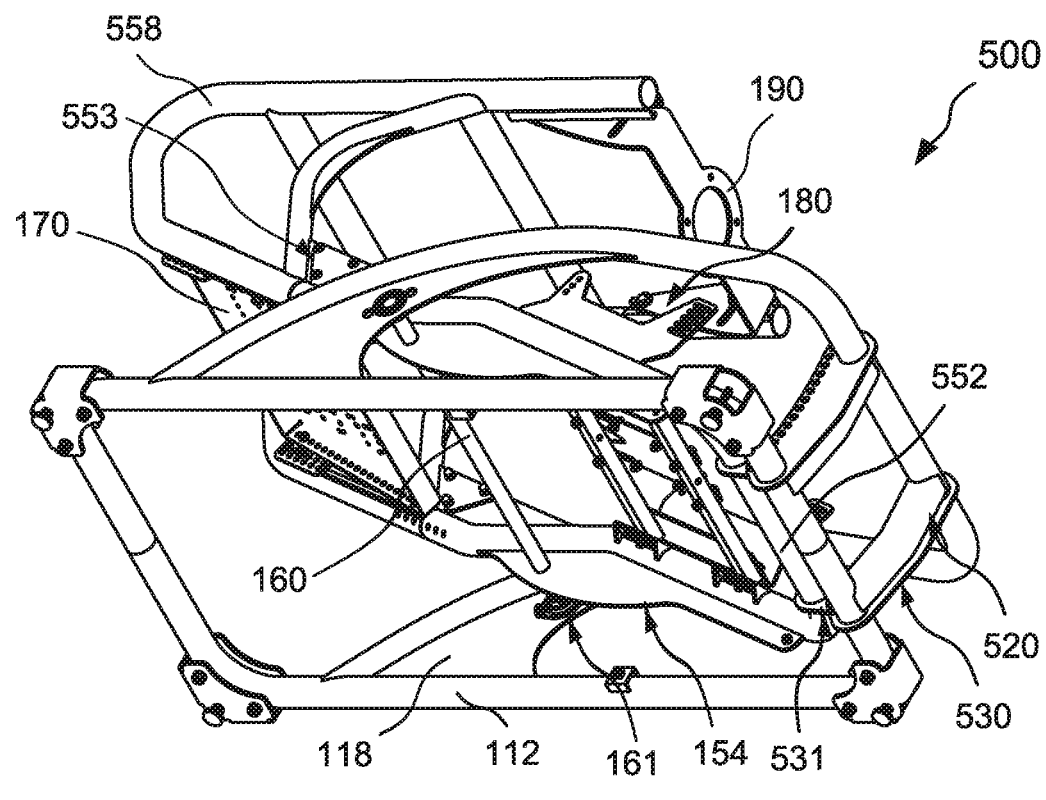
FIG. 5A illustrates a perspective view of the another racing and flight simulator chassis of FIG. 4A in a tilted back position, according to disclosed embodiments.
Figure 5B:
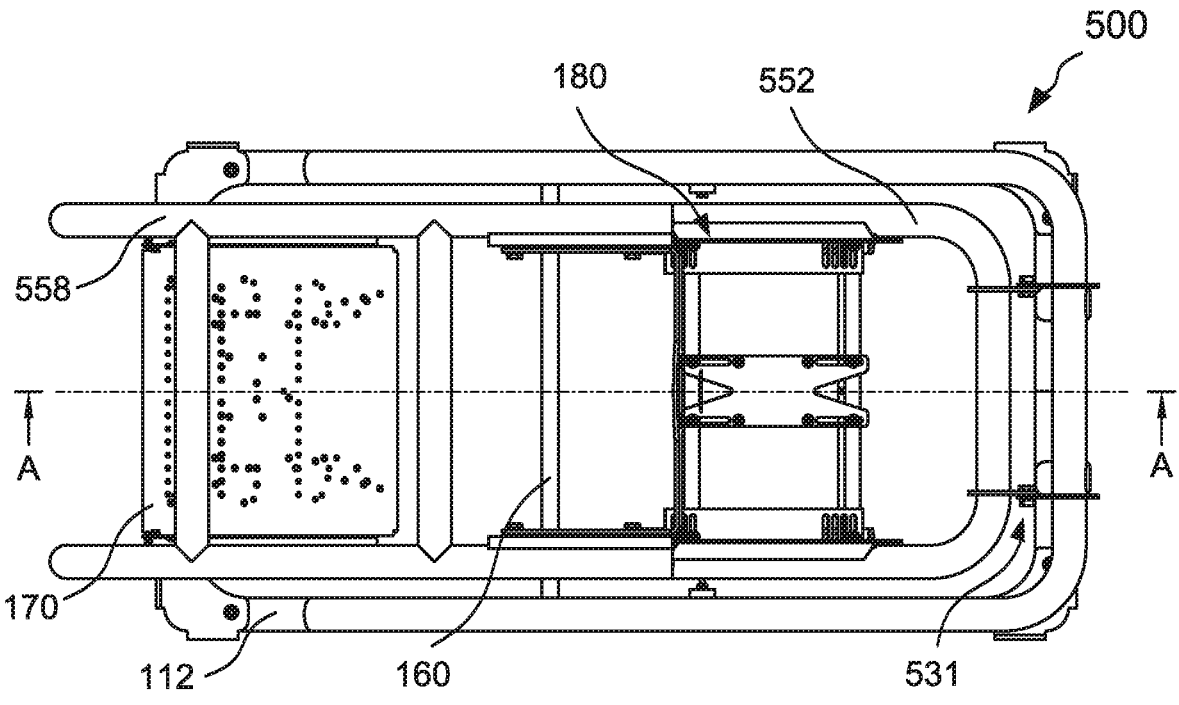
FIG. 5B illustrates a perspective view of the another racing and flight simulator chassis of FIG. 5A and section A-A, according to disclosed embodiments.
Figures 5C, 6A:
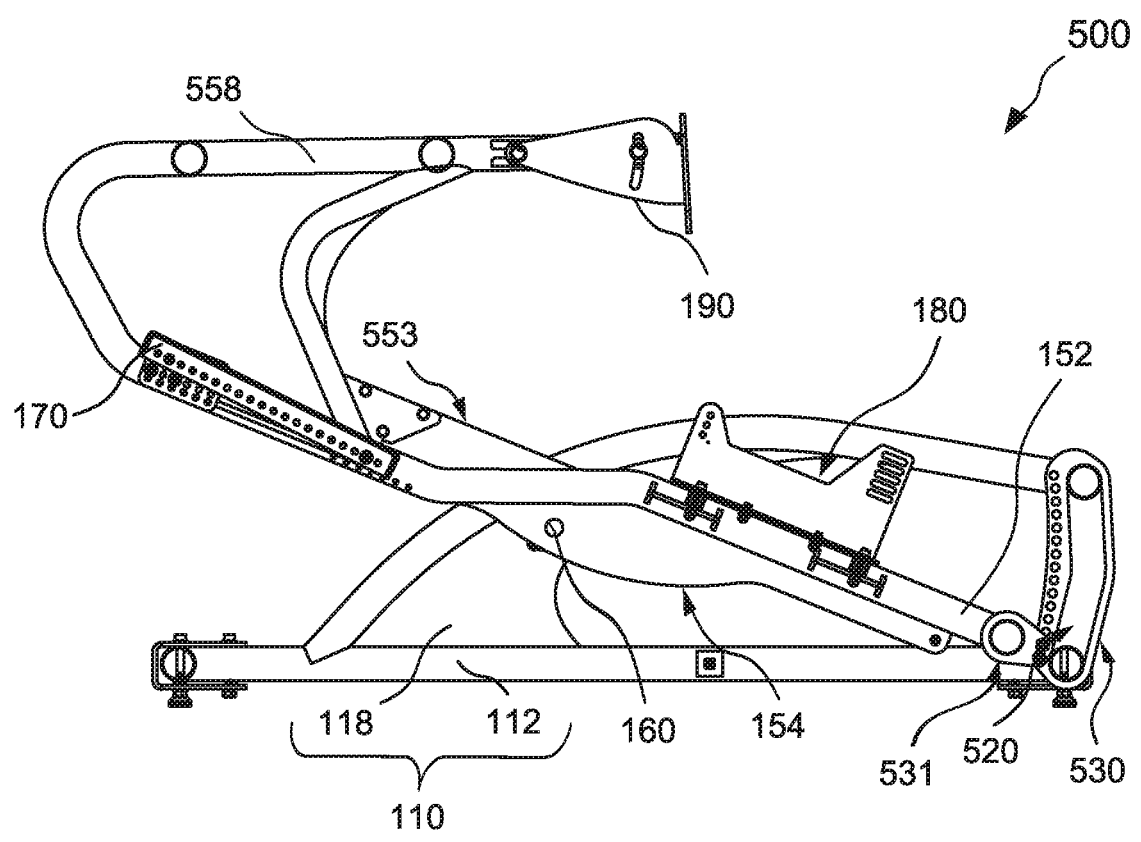
FIG. 5C illustrates a cross-sectional view through section A-A of the another racing and flight simulator chassis of FIG. 5A, according to disclosed embodiments.
FIG. 6A illustrates a perspective view of the another racing and flight simulator chassis of FIG. 4A in an upright position, according to disclosed embodiments.
Figure 6B:
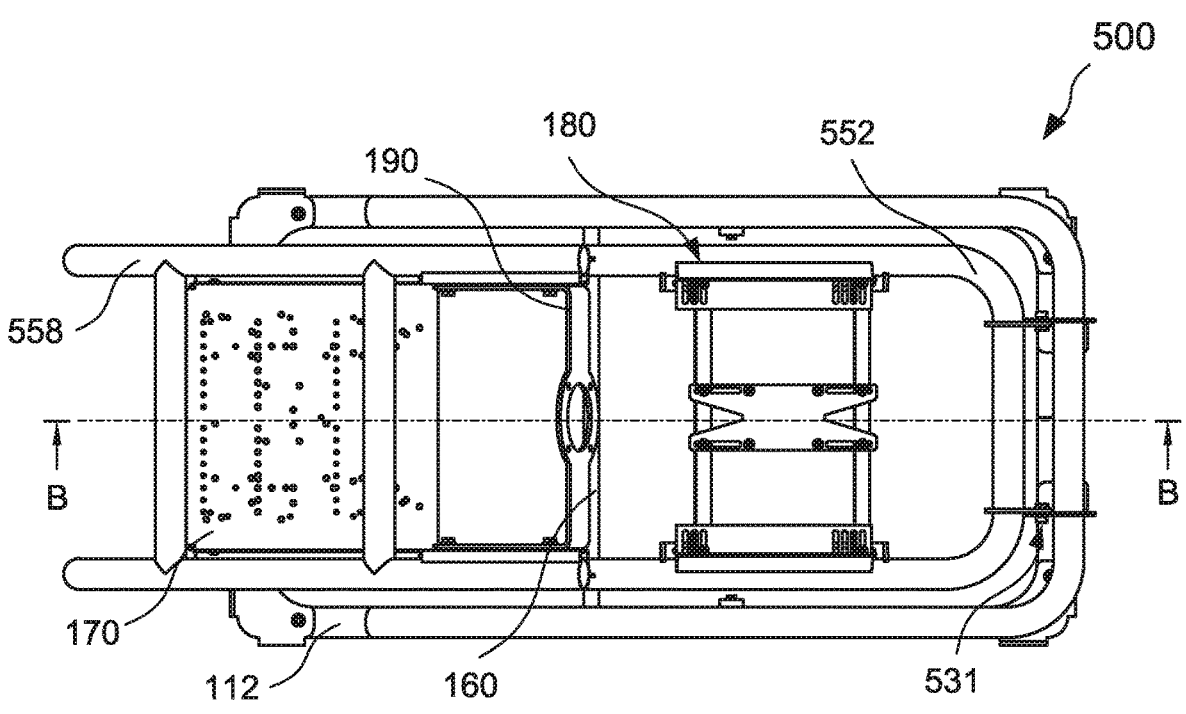
FIG. 6B illustrates a perspective view of the another racing and flight simulator chassis of FIG. 6A and section B-B, according to disclosed embodiments.
Figure 6C:
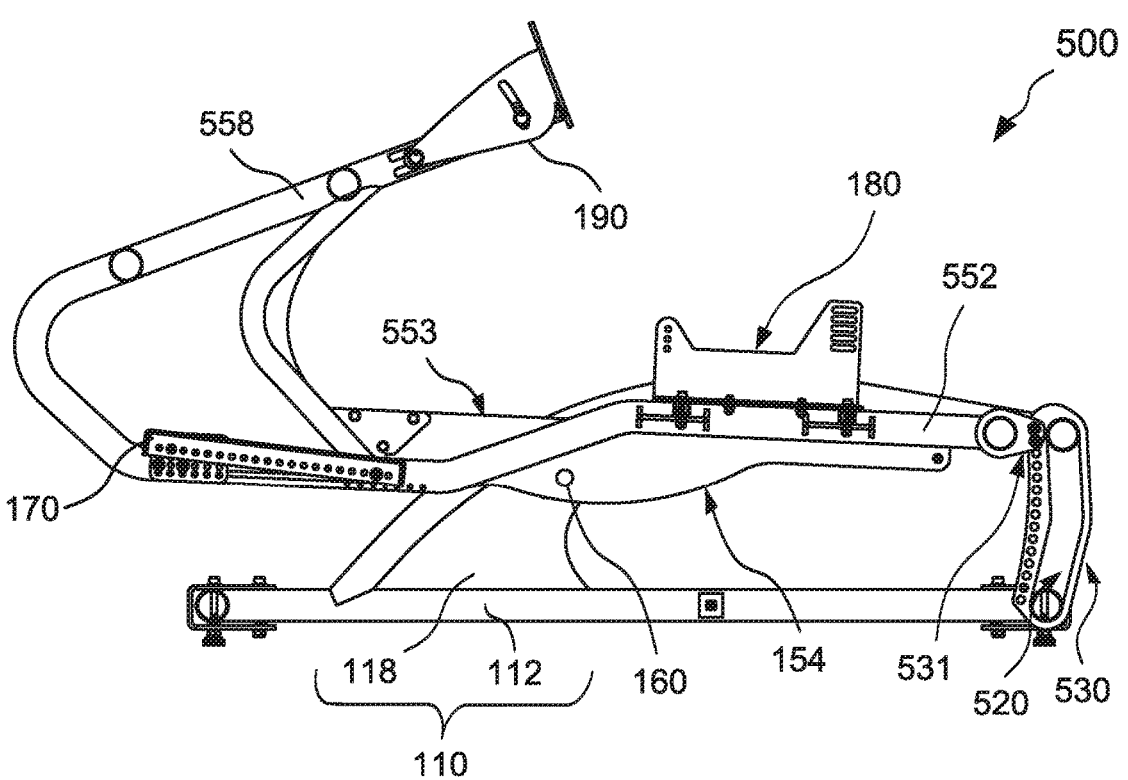
FIG. 6C illustrates a cross-sectional view through section B-B of the another racing and flight simulator chassis of FIG. 6A, according to disclosed embodiments.

FIG. 4A illustrates a perspective view of another racing and flight simulator chassis 500, according to disclosed embodiments. FIG. 4B illustrates an exploded view of the another racing and flight simulator chassis 500 of FIG. 4A, according to disclosed embodiments. FIG. 5A illustrates a perspective view of the another racing and flight simulator chassis 500 of FIG. 4A in a tilted back position, according to disclosed embodiments. FIG. 5B illustrates a perspective view of the another racing and flight simulator chassis 500 of FIG. 5A and section A-A, according to disclosed embodiments. FIG. 5C illustrates a cross-sectional view through section A-A of the another racing and flight simulator chassis 500 of FIG. 5A, according to disclosed embodiments. FIG. 6A illustrates a perspective view of the another racing and flight simulator chassis 500 of FIG. 4A in an upright position, according to disclosed embodiments. FIG. 6B illustrates a perspective view of the another racing and flight simulator chassis 500 of FIG. 6A and section B-B, according to disclosed embodiments. FIG. 6C illustrates a cross-sectional view through section B-B of the another racing and flight simulator chassis 500 of FIG. 6A, according to disclosed embodiments. As illustrated in FIGS. 4A to 6C, and FIGS. 1A to 3C, the racing and flight simulator chassis 500 may be similar in some respects to the racing and flight simulator chassis 100 in FIGS. 1A to 3C, and therefore may be best understood with reference thereto where like numerals designate like components not described again in detail. As illustrated, a racing and flight simulator chassis 500 includes a chassis frame 510, chassis subframe 550, incremental attachment assembly 530, and pivot locking member 531. The chassis frame 510 includes a pair of rail frame supports 520. The chassis subframe 550 is pivotally attached between the chassis frame 510 on opposing sides, respectfully, and rotatable. Generally, at least a portion of the chassis frame 510 and chassis subframe 550 is made from steel tubing for strength and support, as an example, A572 structural steel. However, the embodiments are not limited thereto. Those of ordinary skill in the relevant art may utilize other or materials known in the art for the chassis frame 510 and chassis subframe 550, as long as strength and support of the racing and flight simulator chassis 500 is not compromised. A material of the chassis frame 110, chassis subframe 150, and incremental attachment assembly 530 may be metal, metal alloy, aluminum, metal alloy coated material, or aluminum coated material, or any combination of the foregoing.

In the illustrated embodiments, the racing and flight simulator chassis 100 of FIGS. 1A to 3C includes the incremental attachment assembly 140 and the pivot locking member 141, and the chassis frame 110 includes the pair of rail frame supports 120. The incremental attachment assembly 140 is general tubular and mounted between the pair of rail frame supports 120. The pivot locking member 141 is a set of opposing double pipe clamps that lock the chassis subframe 150 to the chassis frame 110 at, at least two different rotation angles, by having one of the double pipe clamp mounted on top of a back end of the chassis subframe 150 and the incremental attachment assembly 140 and the other of the double pipe clamp mounted, opposing, from a bottom of the back end of the chassis subframe 150 and the incremental attachment assembly 140 and fastened together. Those of ordinary skill in the relevant art may readily appreciate that other alternative members and methods may be implemented for the pivot locking member to releasably lock the chassis subframe to the chassis frame at, at least two different rotation angles, and the embodiments are not limited thereto. As an example, the incremental attachment assembly and the pivot locking member of the racing and flight simulator chassis may be motorized (not shown), whereby the pivot locking member may releasably lock the chassis subframe to the chassis frame at, at least two different rotation angle. As another example, in the illustrated embodiments, the incremental attachment assembly 530 of the racing and flight simulator chassis 500 of FIGS. 4A to 6C is not tubular but a pair of generally elongated oval plates mounted near to outer sides of a pair of rail frame supports 520 of a chassis frame 510. Each of the pair of generally elongated oval plates of the incremental attachment assembly 530 is lined with a plurality of attachment holes. The pivot locking member 531 of the racing and flight simulator chassis 500 of FIGS. 4A to 6C is not the set of opposing double pipe clamps but a pair of fastening plates. The pair of fastening plates of the pivot locking member 531 is mounted near to opposing ends of a bottom of a U-clip shape of a back cockpit member 552. As illustrated, the pivot locking member 531 releasably locks the chassis subframe 550 to the chassis frame 510 at, at least two different rotation angles via attachment of each of the pair of fastening plates of the pivot locking member 531 to one of the plurality of attachment holes of each of pair of generally elongated oval plates of the incremental attachment assembly 530. A rotation angle of the at least two different rotation angles is an angle about pivot points of a pair of rotational devices 161 of the chassis subframe 550 and chassis frame 510. The rotation angle is formed between the chassis subframe 550 relative to the chassis frame 510. When the chassis subframe 550 rotates relative to the chassis frame 510, a length and a height of the racing and flight simulator chassis 500 changes.

The rotation of the chassis subframe 550 to the chassis frame 510 is an up and down or oscillatory motion.

As illustrated, in addition to the chassis frame 510 having the pair of rail frame supports 520, chassis subframe 550, incremental attachment assembly 530, and pivot locking member 531, the chassis frame 510 may further include a base frame 112 and a rail frame 118. The rail frame 118 includes a pair of rail mounting portions 117 and a rail free portion 119. As an example, the base frame 112, the rail frame 118, and the pair of rail frame supports 520 may be integrally formed; however, the embodiments are not limited thereto. The base frame 112, the rail frame 118, and the pair of rail frame supports 520 may be individually formed, and later mounted thereamong. As long as the chassis subframe 550 may rotate to the chassis frame 110 and the racing and flight simulator chassis 500 is stable and rigid during operation. The rail free portion 119 is opposite the pair of rail mounting portions 117. Each of the pair of rail mounting portions 117 is mounted to the base frame 112. The pair of rail frame supports 520 is mounted to the rail free portion 119 and the base frame 112 on opposing ends of the pair of rail frame supports 520, respectively, with a gap therebetween. A shape of the chassis frame 510 is generally quadrilateral shaped and a shape of the rail frame 118 is generally U-shaped. The pair of rail mounting portions 117 are ends of the generally U-shaped rail frame 118 mounted to opposing sides of the base frame 112 near to a front end of the base frame 112 and the curved end of the generally U-shaped rail frame 118 protrudes upwardly and then longitudinally toward a back end of the base frame 112. A shape of each of the pair of rail mounting portions 117 or ends of the generally U-shaped rail frame 118 is generally triangular falcate and curved backward fin-shaped. A base of each of the pair of rail mounting portions 117 is a base of the triangle mounted to the base frame 112 and a tip of the triangle extends near to the back end of the base frame 112. The pair of rotational devices 161 is disposed generally above a center of the triangular falcate and curved backward fin-shape of the pair of rail mounting portions 117, allowing for rotation of the chassis subframe 550 to the chassis frame 510. The triangular base of the falcate and curved backward fin-shape of the pair of rail mounting portions 117 increases a maximum load of the rotating chassis subframe 550.

As illustrated, additionally, the chassis subframe 550 may include a front cockpit member 558 and a back cockpit member 552. The front cockpit member 558 includes a front portion 157, a front upper portion 159, and at least one crossmember 155. The at least one crossmember 155 is mounted to the front cockpit member 558 at opposing ends of the at least one crossmember 155, at corresponding positions of the front cockpit member 558, respectively. A shape of the chassis subframe 550 is generally two parallel U-shapes, separated by a gap defined by a length of the mounted at least one crossmember 155. As illustrated, an amount of the at least one crossmember 155 is two; however, the embodiments are not limited thereto. More than two at least one crossmember 155 may be implemented. The at least one crossmember 155 stabilizes and strengthens the racing and flight simulator chassis 500 during operation. The chassis subframe 550 may further include a pair of curved supporting members 151. One end of each of the pair of curved supporting members 151 is mounted near to one end of each of the U-shape of the chassis subframe 550 and the other end of each of the pair of curved supporting members 151, flared backwards, is mounted toward an other end of the generally two parallel U-shapes of the chassis subframe 550. The pair of curved supporting members 151 stabilizes and strengthens the racing and flight simulator chassis 500 during operation. The front upper portion 159 is defined by the mounted positions of the other end of the U-shape of each of the pair of curved supporting members 151 to an other end of the generally two parallel U-shape of the chassis subframe 550. The front portion 157 is defined by the mounted positions of each of the pair of curved supporting members 151 opposite the front upper portion 159. The back cockpit member 552 is generally U-clip shape. The front cockpit member 558 is mounted to the back cockpit member 552 via ends of each of the U-shape of the chassis subframe 550 and ends of the U-clip shape of the back cockpit member 552. The back cockpit member 552 includes a pair of bottom supporting subframe members 154 on opposing bottom sides of the back cockpit member 552. A shape of the pair of bottom supporting subframe members 154 is generally a drop point knife shape with the blade end near to the ends of the U-clip shape of the back cockpit member 552. An extended handle shape of the pair of bottom supporting subframe members 154 provides enhanced rigidity to the ends of the U-clip shape of the back cockpit member 552 when connected to each of the ends of the generally two parallel U-shape of the chassis subframe 550, increasing a maximum load of the front cockpit member 558 and preventing movement of the racing and flight simulator chassis 500 during operation. As illustrated in the embodiments, the pair of bottom supporting subframe members 154 is a gusset plate. The chassis subframe 550 is pivotally attached between the chassis frame 510 on opposing sides, respectfully, and rotatable, via the pair of bottom supporting subframe members 154, whereby when attached, the front portion 157 is nearer to the base frame 112 than the front upper portion 159. As illustrated, the racing and flight simulator chassis 500 may further include a shaft 160. Each of the pair of rotational devices 161 is mounted to each of the pair of rail mounting portions 117, respectively. The shaft 160 is mounted through the pair of bottom supporting subframe members 154 and to the pair of rotational devices 161, respectively. The chassis subframe 550 is pivotally attached between the chassis frame 510 on opposing sides via the shaft 160 and the pair of rotational devices 161. In the illustrated embodiments, the pair of rotational devices 161 may include a bearing or a biasing device; however, the embodiments are not limited thereto. Those of ordinary skill in the relevant art may utilize other rotational devices or set ups known in the art, as long each of the pair of rotational devices 161 may be mounted to each of the pair of rail mounting portions 117 and the chassis subframe 550 is able to rotate in an up and down or oscillatory motion with the chassis frame 510.

As illustrated, in addition to the racing and flight simulator chassis 500 including the chassis frame 510 having the pair of rail frame supports 520, chassis subframe 550, incremental attachment assembly 530, and pivot locking member 531, the racing and flight simulator chassis 500 may further include a seat mount assembly 180, a pedal deck 170, and a steering deck 190. The seat mount assembly 180 is assembled to the back cockpit member 552 nearer to the pivotal attachment of the chassis subframe 550 between the chassis frame 510 than a bottom of the U-clip shape of the back cockpit member 552. The seat mount assembly 180 is assembled within the U-clip shape of the back cockpit member 552. The pedal deck 170 is mounted to the front portion 557 near to a front end of the front cockpit member 558, between the generally two parallel U-shapes of the chassis subframe 550. The steering deck 190 is mounted to the front upper portion 159 near to and between each of the other end of the generally two parallel U-shape of the chassis subframe 550. The seat mount assembly 180 is generally quadrilateral shape, the pedal deck 170 is generally quadrilateral shape, and the steering deck 190 is generally flat U-shape having triangular-shape arms and a rectangular-like shape base having a central throughole.

As illustrated, another difference between the racing and flight simulator chassis 100 of FIGS. 1A to 3C and the racing and flight simulator chassis 500 of FIGS. 4A to 6C is that the chassis subframe 550 of the racing and flight simulator chassis 500 further includes a pair of supporting attachment assemblies 553. Each pair of supporting attachment assemblies 553 include a front member plate of a front cockpit member 558 mounted to one end of each of the pair of curved supporting members 151 and a back member plate of a back cockpit member 552 mounted opposite the pair of bottom supporting subframe members 154. As illustrated in the embodiments, the front member plate of the front cockpit member 558 and the back member plate of the back cockpit member 552 are gusset plates. When attached, each of the front member plates of the front cockpit member 558 and each of the back member plates of the back cockpit member 552 form the pair of supporting attachment assemblies 553, increasing rigidity of the connection between the front cockpit member 558 to the back cockpit member 552 and simplifying assembly and disassembly therebetween.

As illustrated, yet another difference between the racing and flight simulator chassis 100 of FIGS. 1A to 3C and the racing and flight simulator chassis 500 of FIGS. 4A to 6C is that the racing and flight simulator chassis 500 further includes a pair of internal expansion clamps 556, and a plurality of fasteners. A shape of each of the pair of internal expansion clamps 556 is a tubular shape. Each of the pair of internal expansion clamps 556 include at least two longitudinal grooves, a slot, and a plurality fastener receiving openings. The at least two longitudinal grooves and the slot are disposed along a length of each of the pair of internal expansion clamps 556. The at least two longitudinal grooves and the slot, disposed along the length of the each of the pair of internal expansion clamps 556, are configured such that flexure is permitted and the slot is openable and the circumference of each of the pair of internal expansion clamps 556 is increasable. The slot is expanded via each of the plurality of fasteners being fastened to each of the plurality fastener receiving openings, respectively. As an example, the plurality of fasteners is a plurality of M5 socket-head set screws, an amount of the plurality of fastener receiving openings is six, and an amount of the plurality of fasteners is six; however, the embodiments are not limited thereto. Other types of plurality of fasteners, and more or less than six plurality of fastener receiving openings and plurality of fasteners may be implemented, as long as the slot is expandable via each of the plurality of fasteners being fastened to each of the plurality fastener receiving openings, respectively, such that the circumference of each of the pair of internal expansion clamps 556 increases. A material of each of the pair of internal expansion clamps 556 is aluminum, whereby the pair of internal expansion clamps 556 is machined from a single piece of extruded aluminum tube with heavy walls; however, the embodiments are not limited thereto. As an example, steel may be used, whereby the pair of internal expansion clamps 556 is a pair of drawn over mandrel (DOM) electrically-welded steel tubing.

As illustrated in the embodiments, when the front cockpit member 558 is mounted to the back cockpit member 552 via ends of each of the U-shape of the chassis subframe 550 and ends of the U-clip shape of the back cockpit member 552, each of the pair of internal expansion clamps 556 is fit tightly into each end of each of the U-shape of a chassis subframe 550 and each end of the U-clip shape of a back cockpit member 552 and each of the front member plates of the front cockpit member 558 and each of the back member plates of the back cockpit member 552 are aligned flush thereamong. Each of the front member plates of the front cockpit member 558 are mounted to each of the back member plates of the back cockpit member 552, by, as an example, screw fastening. Each of the plurality of fasteners are fastened to each of the plurality fastener receiving openings, respectively, expanding the circumference of each of the pair of internal expansion clamps 556. As each of the pair of internal expansion clamps 556 expand, a circumferential tensile stress (hoop stress) in each of the pair of internal expansion clamps 556, joining ends of each of the U-shape of the chassis subframe 550 and ends of the U-clip shape of the back cockpit member 552, end to end (butt joined), occur, reinforcing, strengthening, and increasing bending load of the connection therebetween, increasing a maximum load of the front cockpit member 158 and preventing movement of the racing and flight simulator chassis 500 during operation.

As illustrated in FIGS. 4A to 6C, and FIGS. 1A to 3C, the racing and flight simulator chassis 500 further may include a seat 185, a pedal assembly 175, and a control assembly 195. The seat 185 is removably and adjustably assembled to the seat mount assembly 180. The pedal assembly 175 is removably and adjustably assembled to the pedal deck 170. The control assembly 195 is removably and adjustably assembled to the steering deck 190. The seat 185 is vertically adjustable to the seat mount assembly 180 and the seat mount assembly 180 is rotationally and longitudinally adjustable to the back cockpit member 552. The vertical adjustment of the seat mount assembly 180 includes a front vertical adjustment and a rear vertical adjustment. The front vertical adjustment individually adjusts a front portion of the seat 185 and the rear vertical adjustment individually adjusts a rear portion of the seat 185. The pedal assembly 175 is angularly adjustable to the pedal deck 170 and the pedal deck 170 is longitudinally adjustable to the front portion 557. The steering deck 190 is vertically rotatably adjustable and longitudinally adjustable to the front upper portion 159.

In the illustrated embodiments, the seat mount assembly 180 includes a pair of universal side mount L-brackets having pre-drilled holes therethrough and the seat 185 is a side mount racing and/or flight seat. The seat 185 may be different types and/or brands of side mount racing and/or flight seats and the seat mount assembly 180 is configured for various types and/or brands of seats 185 to be mounted thereto via the pre-drilled holes; however, the embodiments are not limited thereto. Those of ordinary skill in the relevant art may utilize other bracketing systems known in the art, as long the seat 185 may be mounted thereto and is vertically adjustable to the seat mount assembly 180 and the seat mount assembly 180 is rotationally and longitudinally adjustable to the back cockpit member 552.

In the illustrated embodiments, the pedal deck 170 includes a deck or plate having pre-drilled holes therethrough and the pedal assembly 175 may be different types and/or brands of pedal assemblies. The pedal assembly 175 is configured to withstand, as an example, at least 140 kg of actual force at the brake pedal and a load cell of 200 kg; however, the embodiments are not limited thereto. The pedal assembly 175 may be configured to withstand, less than or greater than 140 kg of actual force at the brake pedal and/or a load cell of 200 kg, respectively. The pedal deck 170 is configured for various types and/or brands of pedal assemblies 175 to be mounted thereto via the pre-drilled holes; however, the embodiments are not limited thereto. Those of ordinary skill in the relevant art may utilize other deck or plate systems known in the art, as long as the pedal assembly 175 may be mounted thereto, is angularly adjustable to the pedal deck 170 and the pedal deck 170 is longitudinally adjustable to the front portion 157. As an example, the pedal assembly 175 may further include different types and/or brands of rudder pedals. In the illustrated embodiments, a material of the pedal deck 170 is aluminum; however, the embodiments are not limited thereto. The pedal deck 170 may be made of other material commonly known in the art, as an example, steel, aluminum-alloy, or steel-alloy, as long as the pedal assembly 175 may be mounted to the pedal deck 170 and is angularly adjustable to the pedal deck 170 and the pedal deck 170 is longitudinally adjustable to the front portion 157.

In the illustrated embodiments, as an example, a size of the pedal deck 170 is 19" inches×16" inches×4" inches or 20" inches×9" inches×6" inches; however, the embodiments are not limited thereto. The size of the pedal deck 170 may be smaller than or larger than 19" inches×16" inches×4" inches or 20" inches×9" inches×6" inches, as long as the pedal assembly 175 may be mounted to the pedal deck 170 and is angularly adjustable to the pedal deck 170 and the pedal deck 170 is longitudinally adjustable to the front portion 157.

In the illustrated embodiments, each of the triangular-shape arms of the steering deck 190 includes a curved oval opening disposed therethrough, whereby the steering deck 190 may be rotatably adjusted upward or downward. The control assembly 195 may be different types and/or brands of racing and/or flight control assemblies and the steering deck 190 is configured for various types and/or brands of control assemblies to be mounted thereto. As illustrated, the control assembly 195 is a front-mount direct drive force feedback wheel base generating up to 20 Nm of torque. Those of ordinary skill in the relevant art may readily appreciate however that the control assembly 195 may generate less than or greater than 20 Nm of torque, and the steering deck 190 may support different types and/or brands of racing and/or flight control assemblies, and the embodiments are not limited thereto. In addition to supporting front-mount direct drive force feedback wheel bases, the steering deck 190 may further support plate-mount direct drive force feedback wheel bases and may further support side mount direct drive force feedback wheel bases via interchangeable bracket systems (not shown) and the embodiments are not limited thereto. The steering deck 190 may further support different types and/or brands of flight yokes, and single- and dual-throttle joysticks, as examples.

In the illustrated embodiments, as an example, a size of the steering deck 190 is 13" inches×10" inches×3" inches; however, the embodiments are not limited thereto. The size of the pedal deck 170 may be smaller than or larger than 13" inches×10" inches×3" inches, as long as the control assembly 195 may be mounted to the steering deck 190 and is vertically rotatably adjustable and longitudinally adjustable to the steering deck 190.

As illustrated in the embodiments, one of the at least two different rotation angles whereby the pivot locking member 531 releasably locks the chassis subframe 550 to the chassis frame 510 via attachment to at least the incremental attachment assembly 530 may define a tilted back position of the racing and flight simulator chassis 500. When in the tilted back position, the racing and flight simulator chassis 500 is operational for, as an example, Formula 1 racing simulations and glider flight simulations (not shown).

As illustrated in the embodiments, the other of the at least two different rotation angles whereby the pivot locking member 531 releasably locks the chassis subframe 550 to the chassis frame 510 via attachment to at least the incremental attachment assembly 530 may define an upright position of the racing and flight simulator chassis 500. When in the upright position, the racing and flight simulator chassis 500 is operational for, as an example, GT racing simulations and Cessna flight simulations.

Those of ordinary skill in the relevant art may readily appreciate that in addition to the at least two different rotation angles, more than at least two different rotation angles may be achieved by the racing and flight simulator chassis 500 of the embodiments via the incremental attachment assembly 530 and the pivot locking member 531. As such, the racing and flight simulator chassis 500 may be operational for different types and/or brands of racing and/or flight systems, also allowing for hybrid racing, driving or flight set-ups.

Those of ordinary skill in the relevant art may readily appreciate that one or more than one monitor mount and/or stand, portable computer stand, mousepad, mouse tray, keyboard tray, wind mounts, floor mats, or any combination of the foregoing may be added to the racing and flight simulator chassis 100 in support of monitors, computers, mouse, keyboard etc., and the embodiments are not limited thereto. Those of ordinary skill in the relevant art may also readily appreciate that speakers, led lights etc., may also be added to the racing and flight simulator chassis 100, as an example, the seat 185 may comprise speakers therein for better sound quality and led lights may be included in at least the front portion 157 and/or front upper portion 159 for realistic racing or flight experience, and the embodiments are not limited thereto.

Figures 7A, 7B:
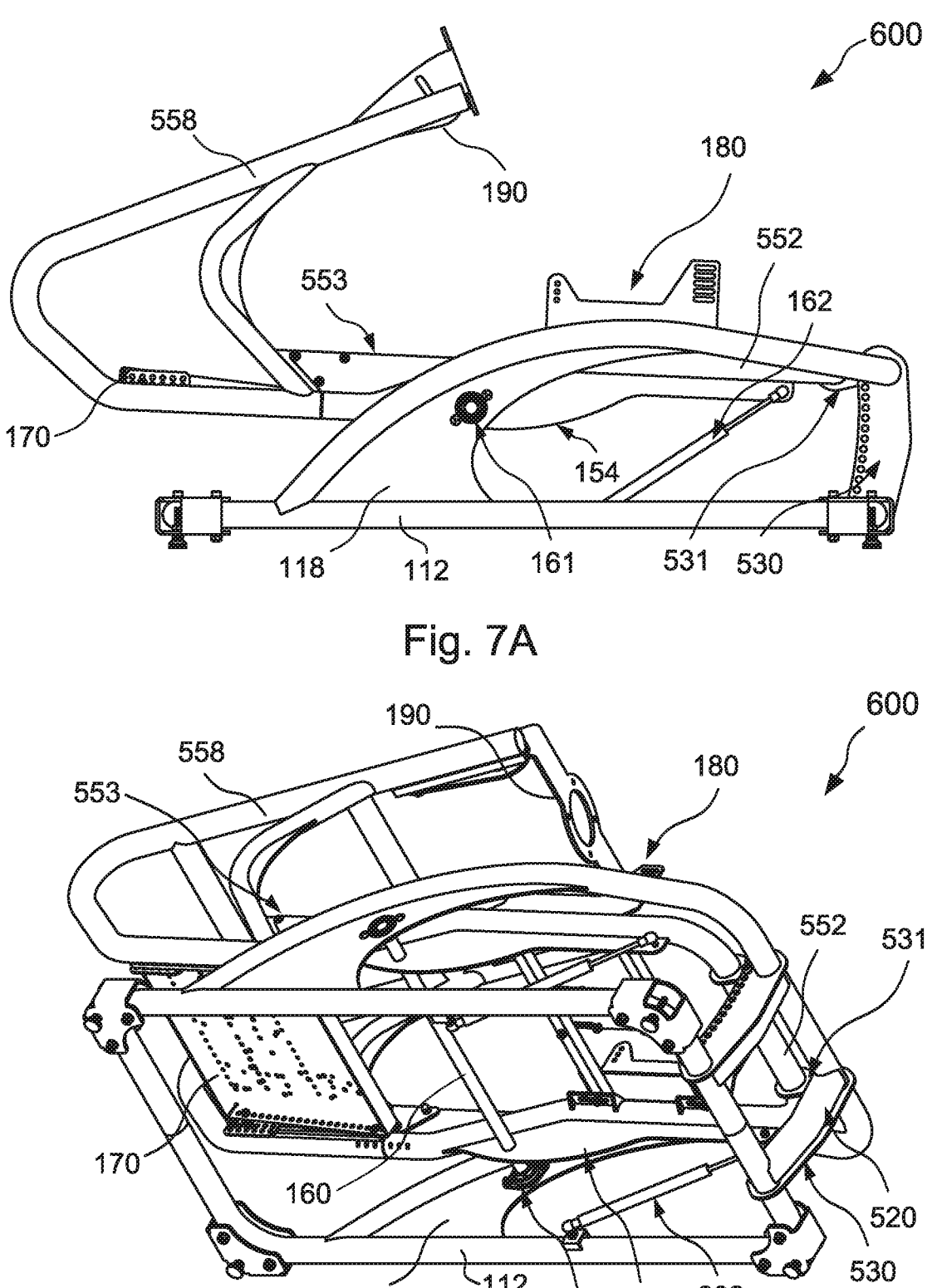
FIG. 7A illustrates a perspective view of yet another racing and flight simulator chassis, according to disclosed embodiments.
FIG. 7B illustrates another perspective view of the yet another racing and flight simulator chassis of FIG. 9A, according to disclosed embodiments.

FIG. 7A illustrates a perspective view of yet another racing and flight simulator chassis 600, according to disclosed embodiments. FIG. 7B illustrates another perspective view of the yet another racing and flight simulator chassis 600 of FIG. 7A, according to disclosed embodiments. As illustrated in FIGS. 7A to 7B, FIGS. 4A to 6C, and FIGS. 1A to 3C, the racing and flight simulator chassis 600 may be similar in some respects to the racing and flight simulator chassis 500 of FIGS. 4A to 6C, and the racing and flight simulator chassis 100 of FIGS. 1A to 3C, and therefore may be best understood with reference thereto where like numerals designate like components not described again in detail. As illustrated in FIGS. 7A to 7B, the difference between the racing and flight simulator chassis 600 of FIGS. 7A to 7B and the racing and flight simulator chassis 500 of FIGS. 4A to 6C is that that the racing and flight simulator chassis 600 further includes a pair of linear actuators 662, each attached to the extended handle shape of each of the pair of bottom supporting subframe members 154 and base frame 112, respectively. The extended handle shape of the pair of bottom supporting subframe members 154 further provides a convenient and rigid attachment point for the pair of linear actuators 662. The pair of linear actuators 662 include a hydraulic linear actuator or a pneumatic linear actuator and increases support of the rotation of the chassis subframe 550 to the chassis frame 510 when moving up and down to the at least two different rotation angles.

Figure 8:
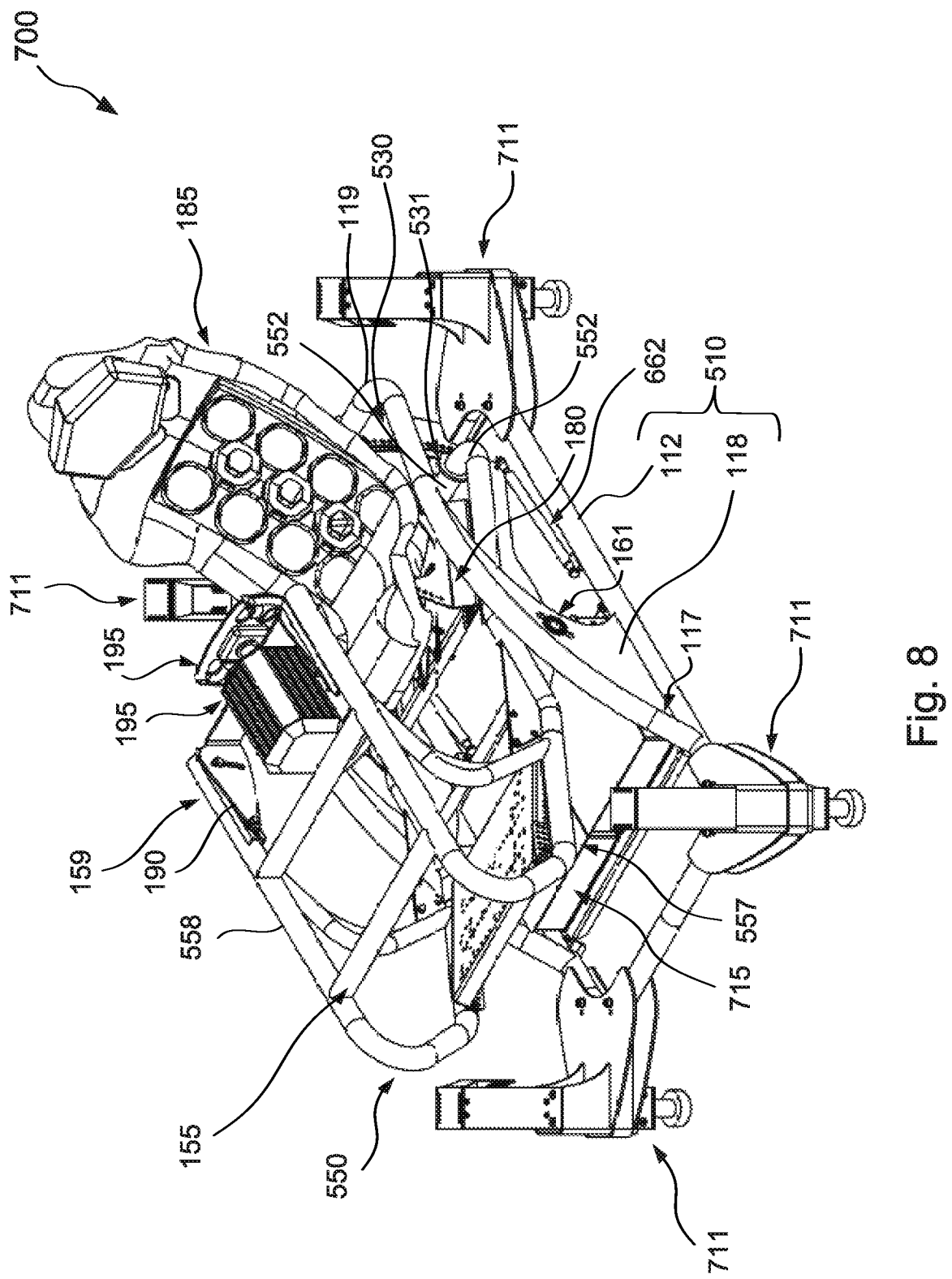
FIG. 8 illustrates a perspective view of further yet another racing and flight simulator chassis, according to disclosed embodiments.

FIG. 8 illustrates a perspective view of further yet another racing and flight simulator chassis 700, according to disclosed embodiments. As illustrated in FIG. 8, FIGS. 7A to 7B, FIGS. 4A to 6C, and FIGS. 1A to 3C, the racing and flight simulator chassis 700 may be similar in some respects to the racing and flight simulator chassis 600 of FIGS. 7A to 7B, the racing and flight simulator chassis 500 of FIGS. 4A to 6C, and the racing and flight simulator chassis 100 of FIGS. 1A to 3C, and therefore may be best understood with reference thereto where like numerals designate like components not described again in detail. As illustrated in FIG. 8, the difference between the racing and flight simulator chassis 700 of FIG. 8 and the racing and flight simulator chassis 600 of FIGS. 7A to 7B is that that the racing and flight simulator chassis 700 further includes a motion system. The motion system includes a set of actuator assemblies 711 and a motion controller 715 electrically connected to the set of actuator assemblies 711. The motion controller 715 is disposed on a plate mounted to the base frame 112. The plate is at least mounted below the front cockpit member 558. The motion controller 715 is configured to control the set of actuator assemblies 711 to move linearly, with velocity and acceleration. The motion system of the racing and flight simulator chassis 700 is compatible to operate with different types and/or brands of racing and flight simulator software. The set of actuator assemblies 711 includes a set of servo actuators. Each of the servo actuators of the set of actuator assemblies 711 is mounted to the base frame 112 and configured to move the racing and flight simulator chassis 700 linearly, with velocity and acceleration. As illustrated, the set of actuator assemblies 711 is a set of servo actuators and an amount of the set of actuator assemblies 711 is four; however, the embodiments are not limited thereto. The set of actuator assemblies 711 may not include a set of servo actuators and the amount of the set of actuator assemblies 711 may be more than or less than four, as long as the motion system is able to move the racing and flight simulator chassis 700 linearly, with velocity and acceleration. As an example, the motion system may allow tilting of the racing and flight simulator chassis 700 and the seat 185 may be allowed to slide, mimicking G-forces experienced in a moving car. The motion system may also allow the racing and flight simulator chassis 700 to be shaken, agitated and vibrated.

Figure 9A:
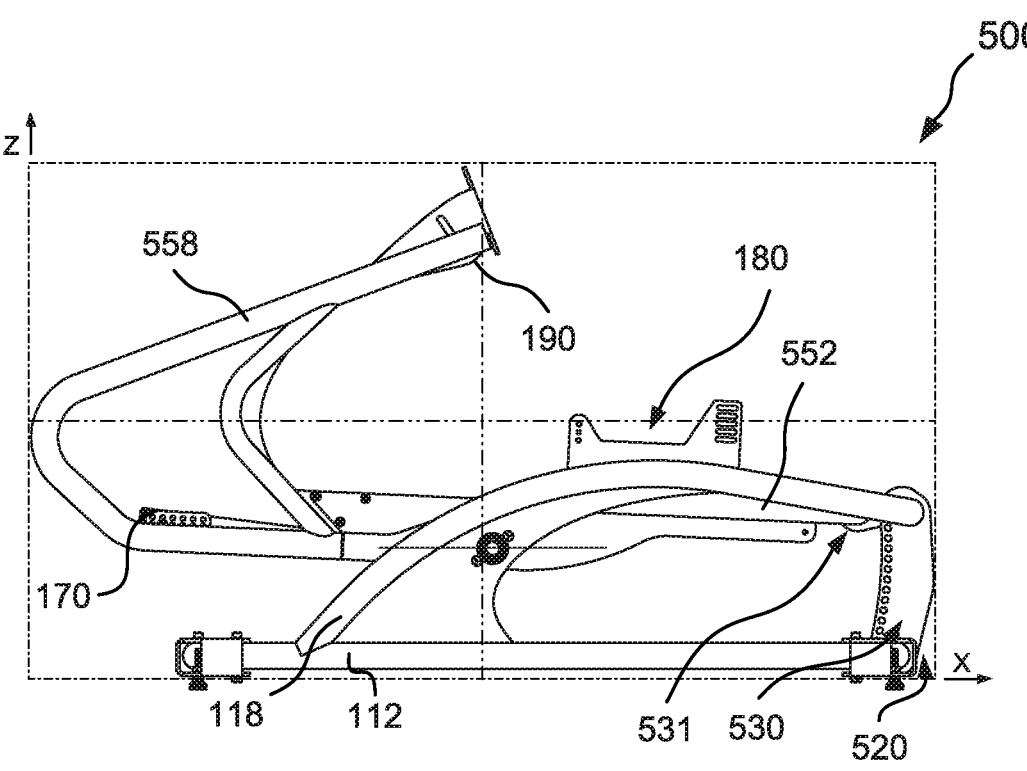
FIG. 9A illustrates a perspective view of the racing and flight simulator chassis of FIG. 4A in an upright position, flush and encompassed within a quadrilateral xz plane box area, according to disclosed embodiments.
Figure 9B:
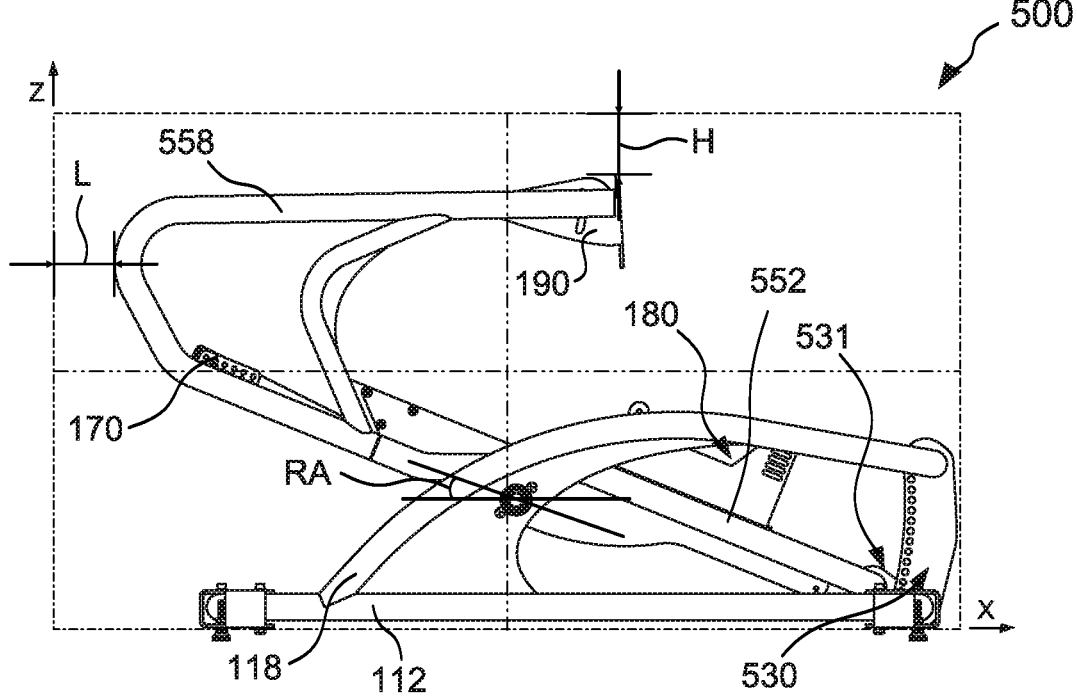
FIG. 9B illustrates a perspective view of the racing and flight simulator chassis of FIG. 4A in a tilted back position, flush and encompassed within a quadrilateral xz plane box area, according to disclosed embodiments.

FIG. 9A illustrates a perspective view of the racing and flight simulator chassis 500 of FIG. 4A in an upright position, flush and encompassed within a quadrilateral xz plane box area, according to disclosed embodiments. FIG. 9B illustrates a perspective view of the racing and flight simulator chassis 500 of FIG. 4A in a tilted back position, flush and encompassed within a quadrilateral xz plane box area, according to disclosed embodiments. As illustrated in FIGS. 9A to 9B, FIGS. 4A to 6C, and FIGS. 1A to 3C, when the chassis subframe 550 rotates up and down between the upright position and tilted back position, a change in length L of the racing and flight simulator chassis 500 is measured by a position of the front end of the front cockpit member 558 to a back end of the pair of rail frame supports 520. When the chassis subframe 550 rotates up and down between the upright position and tilted back position, a change in height H of the racing and flight simulator chassis 500 is measured by a position of a top end of the steering deck 190 to a bottom of the base frame 112. The rotation angle RA of the at least two different rotation angles is an angle about pivot points of the pair of rotational devices 161 of the chassis subframe 550 and chassis frame 510. The rotation angle RA is generally formed when the chassis subframe 550 rotates from a most upright position to a most tilted back position relative to the chassis frame 510. The most upright position may generally be a parallel plane from a side view between one of the pair of rotational devices 161 to the base frame 112. As an example, a range of the rotation angle RA is between 40% to 50%, inclusive.

Figures 10A, 10B, 11A, 11B:
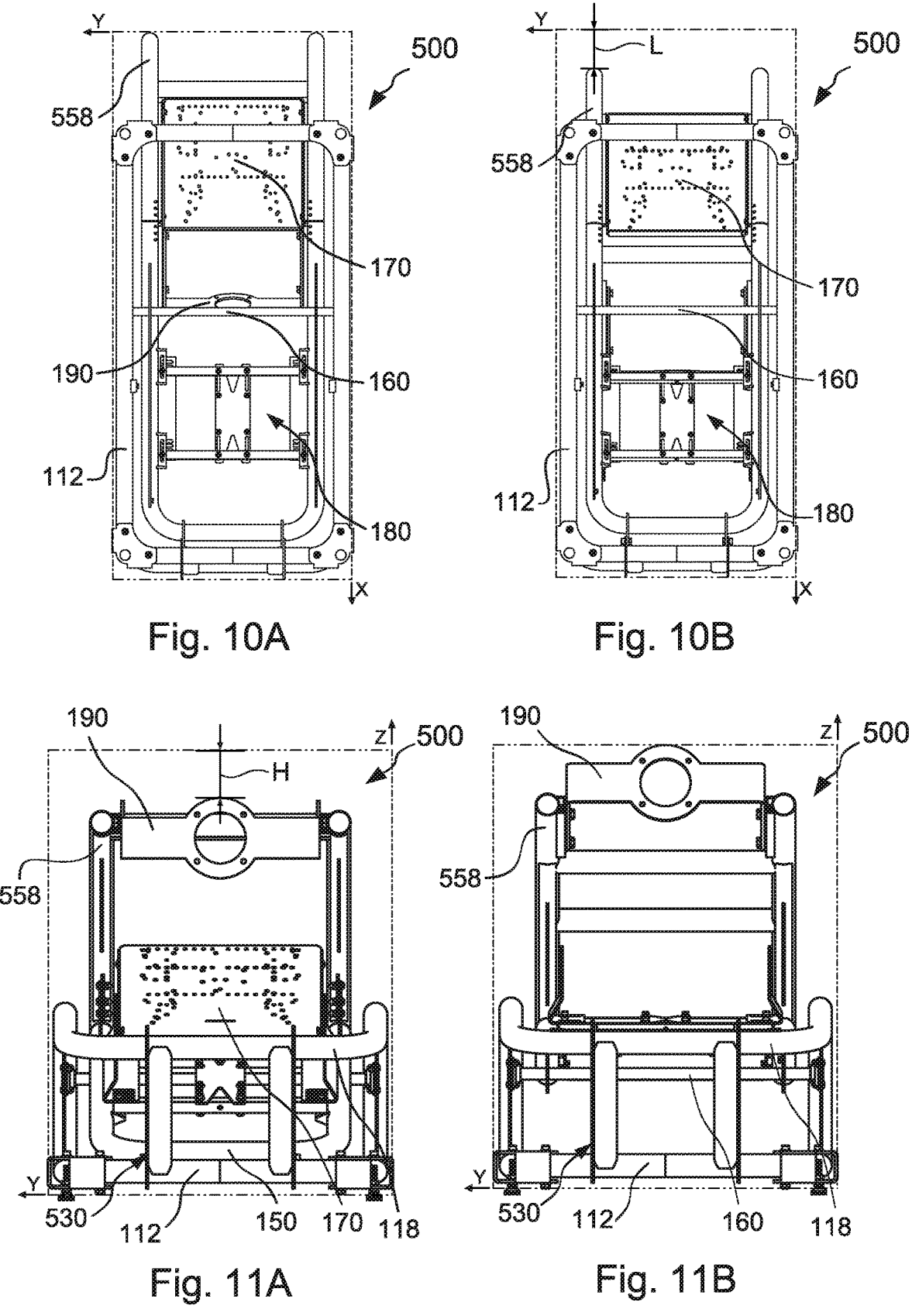
FIG. 10A illustrates a perspective view of the racing and flight simulator chassis of FIG. 4A in an upright position, flush and encompassed within a quadrilateral xy plane box area, according to disclosed embodiments.
FIG. 10B illustrates a perspective view of the racing and flight simulator chassis of FIG. 4A in a tilted back position, flush and encompassed within a quadrilateral xy plane box area, according to disclosed embodiments.
FIG. 11A illustrates a perspective view of the racing and flight simulator chassis of FIG. 4A in an upright position, flush and encompassed within a quadrilateral yz plane box area, according to disclosed embodiments.
FIG. 11B illustrates a perspective view of the racing and flight simulator chassis of FIG. 4A in a tilted back position, flush and encompassed within a quadrilateral yz plane box area, according to disclosed embodiments.

FIG. 10A illustrates a perspective view of the racing and flight simulator chassis 500 of FIG. 4A in an upright position, flush and encompassed within a quadrilateral xy plane box area, according to disclosed embodiments. FIG. 10B illustrates a perspective view of the racing and flight simulator chassis 500 of FIG. 4A in a tilted back position, flush and encompassed within a quadrilateral xy plane box area, according to disclosed embodiments. As illustrated in FIGS. 10A to 10B, FIGS. 9A to 9B, FIGS. 4A to 6C, and FIGS. 1A to 3C, when the chassis subframe 550 rotates relative to the chassis frame 510, a length L of the racing and flight simulator chassis 500 between the back end of the pair of rail frame supports 520 to the front end of the front cockpit member 158 changes. As an example, a longest length L of the racing and flight simulator chassis 500 is between 5% to 7%, inclusive, greater than a shortest length L of the racing and flight simulator chassis 500.

FIG. 11A illustrates a perspective view of the racing and flight simulator chassis 500 of FIG. 4A in an upright position, flush and encompassed within a quadrilateral yz plane box area, according to disclosed embodiments. FIG. 11B illustrates a perspective view of the racing and flight simulator chassis 500 of FIG. 4A in a tilted back position, flush and encompassed within a quadrilateral yz plane box area, according to disclosed embodiments. As illustrated in FIGS. 11A to 11B, FIGS. 9A to 9B, FIGS. 4A to 6C, and FIGS. 1A to 3C, when the chassis subframe 550 rotates relative to the chassis frame 510, a height H of the racing and flight simulator chassis 500 between the top of the steering deck 190 to the bottom of the base frame 112 changes. As an example, a highest height H of the racing and flight simulator chassis 500 is between 10% to 12%, inclusive, greater than a lowest height H of the racing and flight simulator chassis 500.

As illustrated in FIGS. 1 to 11B and according to another aspect of the present disclosure, the racing and flight simulator cockpit 100, may include a chassis frame 110, a chassis subframe 150, a seat mount assembly 180, a seat 185, a pedal deck 170, a pedal assembly 175, a steering deck 190, a control assembly 195, an incremental attachment assembly 140, and a pivot locking member 141. The chassis frame 110 includes a base frame 112, a rail frame 118, and a pair of rail frame supports 120. The rail frame 118 includes a pair of rail mounting portions 117 and a rail free portion 119. As an example, the base frame 112, the rail frame 118, and the pair of rail frame supports 120 may be integrally formed; however, the embodiments are not limited thereto. The base frame 112, the rail frame 118, and the pair of rail frame supports 120 may be individually formed, and later mounted thereamong. As long as the chassis subframe 150 may rotate to the chassis frame 110 and the racing and flight simulator chassis 100 is stable and rigid during operation. The rail free portion 119 is opposite the pair of rail mounting portions 117. Each of the pair of rail mounting portions 117 is mounted to the base frame 112. The pair of rail frame supports 120 is mounted to the rail free portion 119 and the base frame 112 on opposing ends of the pair of rail frame supports 120, respectively, with a gap therebetween. The pair of rail frame supports 120 is mounted to the rail free portion 119 and the base frame 112 on opposing ends of the pair of rail frame supports 120, respectively, with a gap therebetween. A shape of the chassis frame 110 is generally quadrilateral shaped and a shape of the rail frame 118 is generally U-shaped. The pair of rail mounting portions 117 are ends of the generally U-shaped rail frame 118 mounted to opposing sides of the base frame 112 near to a front end of the base frame 112 and the curved end of the generally U-shaped rail frame 118 protrudes upwardly and then longitudinally toward a back end of the base frame 112. A shape of each of the pair of rail mounting portions 117 or ends of the generally U-shaped rail frame 118 is generally triangular falcate and curved backward fin-shaped. A base of each of the pair of rail mounting portions 117 is a base of the triangle mounted to the base frame 112 and a tip of the triangle extends near to the back end of the base frame 112. The pair of rotational devices 161 is disposed generally above a center of the triangular falcate and curved backward fin-shape of the pair of rail mounting portions 117, allowing for rotation of the chassis subframe 150 to the chassis frame 110. The triangular base of the falcate and curved backward fin-shape of the pair of rail mounting portions 117 increases a maximum load of the rotating chassis subframe 150. The chassis subframe 150 includes a front cockpit member 158 and a back cockpit member 152. The at least one crossmember 155 is mounted to the front cockpit member 158 at opposing ends of the at least one crossmember 155, at corresponding positions of the front cockpit member 158, respectively. A shape of the chassis subframe 150 is generally two parallel U-shapes, separated by a gap defined by a length of the mounted at least one crossmember 155. As illustrated, an amount of the at least one crossmember 155 is two; however, the embodiments are not limited thereto. More than two at least one crossmember 155 may be implemented. The at least one crossmember 155 stabilizes and strengthens the racing and flight simulator chassis 100 during operation. The chassis subframe 150 may further include a pair of curved supporting members 151. One end of each of the pair of curved supporting members 151 is mounted near to one end of each of the U-shape of the chassis subframe 150 and the other end of each of the pair of curved supporting members 151, flared backwards, is mounted toward an other end of the generally two parallel U-shapes of the chassis subframe 150. The pair of curved supporting members 151 stabilizes and strengthens the racing and flight simulator chassis 100 during operation. The front upper portion 159 is defined by the mounted positions of the other end of the U-shape of each of the pair of curved supporting members 151 to an other end of the generally two parallel U-shape of the chassis subframe 150. The front portion 157 is defined by the mounted positions of each of the pair of curved supporting members 151 opposite the front upper portion 159. The back cockpit member 152 is generally U-clip shape. The front cockpit member 158 is mounted to the back cockpit member 152 via ends of each of the U-shape of the chassis subframe 150 and ends of the U-clip shape of the back cockpit member 152. The back cockpit member 152 includes a pair of bottom supporting subframe members 154 on opposing bottom sides of the back cockpit member 152. A shape of the pair of bottom supporting subframe members 154 is generally a drop point knife shape with the blade end near to the ends of the U-clip shape of the back cockpit member 152. An extended handle shape of the pair of bottom supporting subframe members 154 provides enhanced rigidity to the ends of the U-clip shape of the back cockpit member 152 when connected to each of the ends of the generally two parallel U-shape of the chassis subframe 150, increasing a maximum load of the front cockpit member 158 and preventing movement of the racing and flight simulator chassis 100 during operation. As illustrated in the embodiments, the pair of bottom supporting subframe members 154 is a gusset plate. The chassis subframe 150 is pivotally attached between the chassis frame 110 on opposing sides, respectfully, and rotatable, via the pair of bottom supporting subframe members 154, whereby when attached, the front portion 157 is nearer to the base frame 112 than the front upper portion 159. The seat mount assembly 180 is assembled to the back cockpit member 152 nearer to the pivotal attachment of the chassis subframe 150 between the chassis frame 110 than a bottom of the U-clip shape of the back cockpit member 152. The seat mount assembly 180 is assembled within the U-clip shape of the back cockpit member 152. The pedal deck 170 is mounted to the front portion 157 near to a front end of the front cockpit member 158, between the generally two parallel U-shapes of the chassis subframe 150. The steering deck 190 is mounted to the front upper portion 159 near to and between each of the other end of the generally two parallel U-shape of the chassis subframe 150. The seat mount assembly 180 is generally quadrilateral shape, the pedal deck 170 is generally quadrilateral shape, and the steering deck 190 is generally flat U-shape having triangular-shape arms and a rectangular-like shape base having a central throughhole. The incremental attachment assembly 140 is mounted to the pair of rail frame supports 120. Generally, at least a portion of the chassis frame 110, chassis subframe 150, and incremental attachment assembly 140 is made from steel tubing for strength and support, as an example, A572 structural steel tubing. However, the embodiments are not limited thereto. Those of ordinary skill in the relevant art may utilize other or materials known in the art for the chassis frame 110, chassis subframe 150, and incremental attachment assembly 140, as long as strength and support of the racing and flight simulator chassis 100 is not compromised. A material of the chassis frame 110, chassis subframe 150, and incremental attachment assembly 140 may be metal, metal alloy, aluminum, metal alloy coated material, or aluminum coated material, or any combination of the foregoing. The pivot locking member 141 is configured to releasably lock the chassis subframe 150 to the chassis frame 110 via attachment to at least the incremental attachment assembly 140 at, at least two different rotation angles. As illustrated, the pivot locking member 141 releasably locks the chassis subframe 150 to the chassis frame 110 via attachment to at least the incremental attachment assembly 140 and the chassis subframe 150 at, at least two different rotation angles. An amount of the pivot locking member 141 may be one, two, or two or more pivot locking members 141, and the embodiments are not limited thereto, as long as the pivot locking member 141 is configured to releasably lock the chassis subframe 150 to the chassis frame 110 via attachment to at least the incremental attachment assembly 140 at, at least two different rotation angles. As an example, the pivot locking member 141 may be at least one of a double pipe clamp (not shown), a set of opposing double pipe clamps, or the like, or any combination of the foregoing. As illustrated, the pivot locking member 141 is a set of opposing double pipe clamps that lock the chassis subframe 150 to the chassis frame 110 by having one of the double pipe clamp mounted on top of a back end of the chassis subframe 150 and the incremental attachment assembly 140 and the other of the double pipe clamp mounted, opposing, from a bottom of the back end of the chassis subframe 150 and the incremental attachment assembly 140 and fastened together, preventing movement of the racing and flight simulator chassis 100 during operation. As an example, the pivot locking member 141 may be one double pipe clamp (not shown) locking the chassis subframe 150 to the chassis frame 110 by mounting on top of the back end of the chassis subframe 150 and the incremental attachment assembly 140, preventing movement of the racing and flight simulator chassis 100 during operation. The one double pipe clamp may have a force of attraction with the back end of the chassis subframe 150 and the incremental attachment assembly 140 or have a weight, such that when mounted, movement of the racing and flight simulator chassis 100 during operation is prevented. A rotation angle of the at least two different rotation angles is an angle about pivot points of a pair of rotational devices 161 of the chassis subframe 150 and chassis frame 110. The rotation angle is formed between the chassis subframe 150 relative to the chassis frame 110. When the chassis subframe 150 rotates relative to the chassis frame 110, a length and a height of the racing and flight simulator chassis 100 changes. The rotation of the chassis subframe 150 to the chassis frame 110 is an up and down or oscillatory motion. The seat 185 is removably and adjustably assembled to the seat mount assembly 180. The pedal assembly 175 is removably and adjustably assembled to the pedal deck 170. The control assembly 195 is removably and adjustably assembled to the steering deck 190. The seat 185 is vertically adjustable to the seat mount assembly 180 and the seat mount assembly 180 is rotationally and longitudinally adjustable to the back cockpit member 152. The vertical adjustment of the seat mount assembly 180 includes a front vertical adjustment and a rear vertical adjustment. The front vertical adjustment individually adjusts a front portion of the seat 185 and the rear vertical adjustment individually adjusts a rear portion of the seat 185. The pedal assembly 175 is angularly adjustable to the pedal deck 170 and the pedal deck 170 is longitudinally adjustable to the front portion 157. The steering deck 190 is vertically rotatably adjustable and longitudinally adjustable to the front upper portion 159.

In the illustrated embodiments, the seat mount assembly 180 includes a pair of universal side mount L-brackets having pre-drilled holes therethrough and the seat 185 is a side mount racing and/or flight seat. The seat 185 may be different types and/or brands of side mount racing and/or flight seats and the seat mount assembly 180 is configured for various types and/or brands of seats 185 to be mounted thereto via the pre-drilled holes; however, the embodiments are not limited thereto. Those of ordinary skill in the relevant art may utilize other bracketing systems known in the art, as long the seat 185 may be mounted thereto and is vertically adjustable to the seat mount assembly 180 and the seat mount assembly 180 is rotationally and longitudinally adjustable to the back cockpit member 152.

In the illustrated embodiments, the pedal deck 170 includes a deck or plate having pre-drilled holes therethrough and the pedal assembly 175 may be different types and/or brands of pedal assemblies. The pedal assembly 175 is configured to withstand, as an example, at least 140 kg of actual force at the brake pedal and a load cell of 200 kg; however, the embodiments are not limited thereto. The pedal assembly 175 may be configured to withstand, less than or greater than 140 kg of actual force at the brake pedal and/or a load cell of 200 kg, respectively. The pedal deck 170 is configured for various types and/or brands of pedal assemblies 175 to be mounted thereto via the pre-drilled holes; however, the embodiments are not limited thereto. Those of ordinary skill in the relevant art may utilize other deck or plate systems known in the art, as long as the pedal assembly 175 may be mounted thereto, is angularly adjustable to the pedal deck 170 and the pedal deck 170 is longitudinally adjustable to the front portion 157. As an example, the pedal assembly 175 may further include different types and/or brands of rudder pedals. In the illustrated embodiments, a material of the pedal deck 170 is aluminum; however, the embodiments are not limited thereto. The pedal deck 170 may be made of other material commonly known in the art, as an example, steel, aluminum-alloy, or steel-alloy, as long as the pedal assembly 175 may be mounted to the pedal deck 170 and is angularly adjustable to the pedal deck 170 and the pedal deck 170 is longitudinally adjustable to the front portion 157.

In the illustrated embodiments, as an example, a size of the pedal deck 170 is 19" inches×16" inches×4" inches or 20" inches×9" inches×6" inches; however, the embodiments are not limited thereto. The size of the pedal deck 170 may be smaller than or larger than 19" inches×16" inches×4" inches or 20" inches×9" inches×6" inches, as long as the pedal assembly 175 may be mounted to the pedal deck 170 and is angularly adjustable to the pedal deck 170 and the pedal deck 170 is longitudinally adjustable to the front portion 157.

In the illustrated embodiments, each of the triangular-shape arms of the steering deck 190 includes a curved oval opening disposed therethrough, whereby the steering deck 190 may be rotatably adjusted upward or downward. The control assembly 195 may be different types and/or brands of racing and/or flight control assemblies and the steering deck 190 is configured for various types and/or brands of control assemblies to be mounted thereto. As illustrated, the control assembly 195 is a front-mount direct drive force feedback wheel base generating up to 20 Nm of torque. Those of ordinary skill in the relevant art may readily appreciate however that the control assembly 195 may generate less than or greater than 20 Nm of torque, and the steering deck 190 may support different types and/or brands of racing and/or flight control assemblies, and the embodiments are not limited thereto. In addition to supporting front-mount direct drive force feedback wheel bases, the steering deck 190 may further support plate-mount direct drive force feedback wheel bases and may further support side mount direct drive force feedback wheel bases via interchangeable bracket systems (not shown) and the embodiments are not limited thereto. The steering deck 190 may further support different types and/or brands of flight yokes, and single- and dual-throttle joysticks, as examples.

In the illustrated embodiments, as an example, a size of the steering deck 190 is 13" inches×10" inches×3" inches; however, the embodiments are not limited thereto. The size of the pedal deck 170 may be smaller than or larger than 13" inches×10" inches×3" inches, as long as the control assembly 195 may be mounted to the steering deck 190 and is vertically rotatably adjustable and longitudinally adjustable to the steering deck 190.

As illustrated, the racing and flight simulator chassis 100 may further include a shaft 160. Each of the pair of rotational devices 161 is mounted to each of the pair of rail mounting portions 117, respectively. The shaft 160 is mounted through the pair of bottom supporting subframe members 154 and to the pair of rotational devices 161, respectively. The chassis subframe 150 is pivotally attached between the chassis frame 110 on opposing sides via the shaft 160 and the pair of rotational devices 161. In the illustrated embodiments, the pair of rotational devices 161 may include a bearing or a biasing device; however, the embodiments are not limited thereto. Those of ordinary skill in the relevant art may utilize other rotational devices or set ups known in the art, as long each of the pair of rotational devices 161 may be mounted to each of the pair of rail mounting portions 117 and the chassis subframe 150 is able to rotate in an up and down or oscillatory motion with the chassis frame 110.

As illustrated, the chassis subframe 550 of the racing and flight simulator chassis 500 may further include a pair of supporting attachment assemblies 553. Each pair of supporting attachment assemblies 553 include a front member plate of a front cockpit member 558 mounted to one end of each of the pair of curved supporting members 151 and a back member plate of a back cockpit member 552 mounted opposite the pair of bottom supporting subframe members 154. As illustrated in the embodiments, the front member plate of the front cockpit member 558 and the back member plate of the back cockpit member 552 are gusset plates. When attached, each of the front member plates of the front cockpit member 558 and each of the back member plates of the back cockpit member 552 form the pair of supporting attachment assemblies 553, increasing rigidity of the connection between the front cockpit member 558 to the back cockpit member 552 and simplifying assembly and disassembly therebetween.

As illustrated, the racing and flight simulator chassis 600 may further include a pair of linear actuators 662, each attached to the extended handle shape of each of the pair of bottom supporting subframe members 154 and base frame 112, respectively. The extended handle shape of the pair of bottom supporting subframe members 154 further provides a convenient and rigid attachment point for the pair of linear actuators 662. The pair of linear actuators 662 include a hydraulic linear actuator or a pneumatic linear actuator and increases support of the rotation of the chassis subframe 550 to the chassis frame 510 when moving up and down to the at least two different rotation angles.

As illustrated, when the chassis subframe 550 rotates up and down between the upright position and tilted back position, a change in length L of the racing and flight simulator chassis 500 is measured by a position of the front end of the front cockpit member 558 to a back end of the pair of rail frame supports 520. When the chassis subframe 550 rotates up and down between the upright position and tilted back position, a change in height H of the racing and flight simulator chassis 500 is measured by a position of a top end of the steering deck 190 to a bottom of the base frame 112. The rotation angle RA of the at least two different rotation angles is an angle about pivot points of the pair of rotational devices 161 of the chassis subframe 550 and chassis frame 510. The rotation angle RA is generally formed when the chassis subframe 550 rotates from a most upright position to a most tilted back position relative to the chassis frame 510. The most upright position may generally be a parallel plane from a side view between one of the pair of rotational devices 161 to the base frame 112. As an example, a range of the rotation angle RA is between 40% to 50%, inclusive.

As illustrated, when the chassis subframe 550 rotates relative to the chassis frame 510, a length L of the racing and flight simulator chassis 500 between the back end of the pair of rail frame supports 520 to the front end of the front cockpit member 158 changes. As an example, a longest length L of the racing and flight simulator chassis 500 is between 5% to 7%, inclusive, greater than a shortest length L of the racing and flight simulator chassis 500.

As illustrated, when the chassis subframe 550 rotates relative to the chassis frame 510, a height H of the racing and flight simulator chassis 500 between the top of the steering deck 190 to the bottom of the base frame 112 changes. As an example, a highest height H of the racing and flight simulator chassis 500 is between 10% to 12%, inclusive, greater than a lowest height H of the racing and flight simulator chassis 500.

A racing and flight simulator chassis 100/500/600/700 including a chassis frame 110/510, chassis subframe 150/550, incremental attachment assembly 140/530, and pivot locking member 141/531 is provided. The chassis subframe 150/550 is pivotally attached between the chassis frame 110/510 on opposing sides, respectfully, and rotatable. The incremental attachment assembly 140/530 is mounted to a pair of rail frame supports 120 of the chassis frame 110/510. The pivot locking member 141/531 is configured to releasably lock the chassis subframe 150/550 to the chassis frame 110/510 via attachment to at least the incremental attachment assembly 140/530 at, at least two different rotation angles.

In the illustrated embodiments, the racing and flight simulator chassis 100/500/600/700 may be adjusted to a real Formula 1 and Glider etc., GT and Cessna etc., and various hybrid racing and flight simulation set-ups via rotation of the chassis subframe 150/550 and securing of the pivot locking member 141/531. The single set up method, decreases the amount of parts needed and complexity of the racing and flight simulator chassis 100/500/600/700, decreasing weight and costs. Also, the incremental attachment assembly 140/530 and pivot locking member 131, allowing for more than at least two different rotation angles to be achieved, and the vertically and longitudinally adjustable seat 185, angularly and longitudinally adjustable pedal assembly 175, and vertically rotatably and longitudinally adjustable steering deck 190, allow customization of the racing and flight simulator chassis 100/500/600/700 to different types and/or brands of racing and/or flight systems, saving costs as proprietary simulator chassis' are not needed, making it more convenient for users. and expanding choices of available racing and flight simulator software systems for users.

In the illustrated embodiments, the triangular base of the falcate and curved backward fin-shape of the pair of rail mounting portions 117, increasing the maximum load of the rotating chassis subframe 150/550, the extended handle shape of the pair of bottom supporting subframe members 154, providing enhanced rigidity to the ends of the U-clip shape of the back cockpit member 152 when connected to each of the ends of the generally two parallel U-shape of the chassis subframe 150/550, increasing a maximum load of the front cockpit member 158, and expansion of the circumference of each of the pair of internal expansion clamps 556 circumferential tensile stress in each of the pair of internal expansion clamps 556, joining ends of each of the U-shape of the chassis subframe 150/550 and ends of the U-clip shape of the back cockpit member 552, reinforcing, strengthening, and increasing bending load of the connection, all augment the rigidity and sturdiness of the racing and flight simulator chassis 100/500/600/700, such that the control assembly 195 may support generation of up to 20 Nm of torque, the pedal assembly 175 may withstand at least 140 kg of actual force at the brake pedal and a load cell of 200 kg, and various types and/or brands of seats 185 may be mounted to the seat mount assembly 180, without the racing and flight simulator chassis 100/500/600/700 flexing under duress during operation.

In the illustrated embodiments, a rotation angle RA of the at least two different rotation angles is an angle about pivot points of the pivotal attachments of the chassis subframe 150/550 and chassis frame 110/510. When the chassis subframe 150/550 rotates relative to the chassis frame 110/510, a length L and a height H of the racing and flight simulator chassis 100/500/600/700 changes. The highest height H of the racing and flight simulator chassis 100/500/600/700 being between 10% to 12%, inclusive, greater than a lowest height H of the racing and flight simulator chassis 100/500/600/700, and the longest length L of the racing and flight simulator chassis 100/500/600/700 being between 5% to 7%, inclusive, greater than a shortest length L of the racing and flight simulator chassis 500, minimize the space required for users for adjustment, making the racing and flight simulator chassis 100/500/600/700 more space saving and convenient.

Therefore, embodiments disclosed herein are well adapted to attain the ends and advantages mentioned as well as those that are inherent therein. The particular embodiments disclosed above are illustrative only, as the embodiments disclosed may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A racing and flight simulator chassis, comprising:
a chassis frame having a base frame, a rail frame, and a pair of rail frame supports, the rail frame including a pair of rail mounting portions and a rail free portion, the rail free portion is opposite the pair of rail mounting portions, each of the pair of rail mounting portions is mounted to the base frame, and the pair of rail frame supports is mounted to the rail free portion and the base frame on opposing ends of the pair of rail frame supports, respectively, with a gap therebetween;
a chassis subframe having a front cockpit member and a back cockpit member, the front cockpit member including a front bottom portion, a front upper portion, and at least one crossmember, the at least one crossmember is mounted to the front cockpit member on opposing ends of the at least one crossmember, respectively, and the front cockpit member is mounted to the back cockpit member via the front bottom portion, the back cockpit member including a pair of bottom supporting subframe members on opposing bottom sides of the back cockpit member, and the chassis subframe is pivotally attached between the chassis frame on opposing sides, respectfully, and rotatable, whereby when attached, the front bottom portion is nearer to the base frame than the front upper portion, a seat mount assembly assembled to the back cockpit member;

a pedal deck mounted to the front bottom portion;

a steering deck mounted to the front upper portion;

an incremental attachment assembly mounted to the pair of rail frame supports, the incremental attachment assembly including at least two attachment holes; and a pivot locking member configured to releasably lock the chassis subframe to the chassis frame via attachment to at least the attachment holes at, at least two different rotation angles, wherein the rotation angle of the at least two different rotation angles is an angle about pivot points of the pivotal attachments of the chassis subframe on opposing sides and between the chassis frame, whereby the rotation angle is formed between the chassis subframe relative to the chassis frame.

2. The racing and flight simulator chassis of claim 1, further comprising a seat, removably and adjustably assembled to the seat mount assembly, a pedal assembly, removably and adjustably assembled to the pedal deck, and a control assembly, removably and adjustably assembled to the steering deck, whereby the seat is vertically adjustable to the seat mount assembly and the seat mount assembly is longitudinally adjustable to the back cockpit member, the pedal assembly is angularly adjustable to the pedal deck and the pedal deck is longitudinally adjustable to the front bottom portion, and the steering deck is vertically and longitudinally adjustable to the front upper portion.

3. The racing and flight simulator chassis of claim 1, wherein the chassis subframe further comprises a pair of supporting attachment assemblies on opposing upper sides of the front bottom portion and the back cockpit member, respectively, whereby the pair of supporting attachment assemblies support mounting of the front cockpit member to the back cockpit member via the front bottom portion.

4. The racing and flight simulator chassis of claim 1, further comprising a shaft and a pair of rotational devices, each of the pair of rotational devices is mounted to each of the pair of rail mounting portions, respectively, and the shaft is mounted through the pair of bottom supporting subframe members and to the pair of rotational devices, respectively, whereby the chassis subframe is pivotally attached between the chassis frame on opposing sides via the shaft and the pair of rotational devices.

5. The racing and flight simulator chassis of claim 4, wherein the rotational device comprises a bearing or a biasing device.

6. The racing and flight simulator chassis of claim 1, further comprising a pair of linear actuators attached to the pair of bottom supporting subframe members and base frame, respectively, wherein the pair of linear actuators comprise a hydraulic linear actuator or a pneumatic linear actuator.

7. The racing and flight simulator chassis of claim 1, wherein a range of the rotation angle is between 40% to 50%, inclusive.

8. The racing and flight simulator chassis of claim 1, wherein when the chassis subframe rotates relative to the chassis frame, a length of the racing and flight simulator chassis between a back end portion of the pair of rail frame supports to a front tip portion of the front cockpit member changes, whereby the longest length of the racing and flight simulator chassis is between 5% to 7%, inclusive, greater than a shortest length of the racing and flight simulator chassis.

9. The racing and flight simulator chassis of claim 1, wherein when the chassis subframe rotates relative to the chassis frame, a height of the racing and flight simulator chassis between a bottom portion of the base frame to a top portion of the steering deck changes, whereby the highest height of the racing and flight simulator chassis is between 10% to 12%, inclusive, greater than a lowest height of the racing and flight simulator chassis.

10. The racing and flight simulator chassis of claim 1, wherein the base frame, the rail frame, and the pair of rail frame supports are integrally formed.

11. The racing and flight simulator chassis of claim 1, wherein the chassis frame and chassis subframe comprise at least one of a metal, metal alloy, aluminum, metal alloy coated material, or aluminum coated material, or any combination of the foregoing.

12. The racing and flight simulator cockpit, comprising:

a chassis frame having a base frame, a rail frame, and a pair of rail frame supports, the rail frame including a pair of rail mounting portions and a rail free portion, the rail free portion is opposite the pair of rail mounting portions, each of the pair of rail mounting portions is mounted to the base frame, and the pair of rail frame supports is mounted to the rail free portion and the base frame on opposing ends of the pair of rail frame supports, respectively, with a gap therebetween;

a chassis subframe having a front cockpit member and a back cockpit member, the front cockpit member including a front bottom portion, a front upper portion, and at least one crossmember, the at least one crossmember is mounted to the front cockpit member on opposing ends of the at least one crossmember, respectively, and the front cockpit member is mounted to the back cockpit member via the front bottom portion, the back cockpit member including a pair of bottom supporting subframe members on opposing bottom sides of the back cockpit member, and the chassis subframe is pivotally attached between the chassis frame on opposing sides, respectfully, and rotatable, whereby when attached, the front bottom portion is nearer to the base frame than the front upper portion, a seat mount assembly assembled to the back cockpit member;

a seat, removably and adjustably assembled to the seat mount assembly;

a pedal deck mounted to the front bottom portion;

a pedal assembly, removably and adjustably assembled to the pedal deck;

a steering deck mounted to the front upper portion;

a control assembly, removably and adjustably assembled to the steering deck;

an incremental attachment assembly mounted to the pair of rail frame supports, the incremental attachment assembly including at least two attachment holes; and a pivot locking member configured to releasably lock the chassis subframe to the chassis frame via attachment to at least the attachment holes at, at least two different rotation angles, whereby the seat is vertically adjustable to the seat mount assembly and the seat mount assembly is longitudinally adjustable to the back cockpit member, the pedal assembly is angularly adjustable to the pedal deck and the pedal deck is longitudinally adjustable to the front bottom portion, and the steering deck is vertically and longitudinally adjustable to the front upper portion, and wherein the rotation angle of the at least two different rotation angles is an angle about pivot points of the pivotal attachments of the chassis subframe on opposing sides and between the chassis frame, whereby the rotation angle is formed between the chassis subframe relative to the chassis frame.

13. The racing and flight simulator cockpit of claim 12, wherein the chassis subframe further comprises a pair of supporting attachment assemblies on opposing upper sides of the front bottom portion and the back cockpit member, respectively, the pair of supporting attachment assemblies support mounting of the front cockpit member to the back cockpit member via the front bottom portion.

14. The racing and flight simulator cockpit of claim 12, further comprising a shaft and a pair of rotational devices, each of the pair of rotational devices is mounted to each of the pair of rail mounting portions, respectively, and the shaft is mounted through the pair of bottom supporting subframe members and to the pair of rotational devices, respectively, wherein the rotational device comprises a bearing or a biasing device, and whereby the chassis subframe is pivotally attached between the chassis frame on opposing sides via the shaft and the pair of rotational devices.

15. The racing and flight simulator cockpit of claim 12, further comprising a pair of linear actuators attached to the pair of bottom supporting subframe members and base frame, respectively, wherein the pair of linear actuators comprise a hydraulic linear actuator or a pneumatic linear actuator.

16. The racing and flight simulator cockpit of claim 12, wherein a range of the rotation angle is between 40% to 50%, inclusive.

17. The racing and flight simulator cockpit of claim 12, wherein when the chassis subframe rotates relative to the chassis frame, a length of the racing and flight simulator chassis between a back end portion of the pair of rail frame supports to a front tip portion of the front cockpit member changes, whereby the longest length of the racing and flight simulator chassis is between 5% to 7%, inclusive, greater than a shortest length of the racing and flight simulator chassis.

18. The racing and flight simulator cockpit of claim 12, wherein when the chassis subframe rotates relative to the chassis frame, a height of the racing and flight simulator chassis between a bottom portion of the base frame to a top portion of the steering deck changes, whereby the highest height of the racing and flight simulator chassis is between 10% to 12%, inclusive, greater than a lowest height of the racing and flight simulator chassis.

19. The racing and flight simulator cockpit of claim 12, wherein the base frame, the rail frame, and the pair of rail frame supports are integrally formed.

20. The racing and flight simulator cockpit of claim 12, wherein the chassis frame and chassis subframe comprise at least one of a metal, metal alloy, aluminum, metal alloy coated material, or aluminum coated material, or any combination of the foregoing.

\* \* \* \* \*